(12) United States Patent
Boehm et al.

(10) Patent No.: US 12,194,466 B2
(45) Date of Patent: Jan. 14, 2025

(54) DETERMINING A QUANTITY OF AN ANALYTE IN A BLOOD SAMPLE

(71) Applicant: Roche Diagnostics Operations, Inc., Indianapolis, IN (US)

(72) Inventors: Christoph Boehm, Viernheim (DE); Thorsten Brueckner, Schriesheim (DE); Thomas Fischer, Rauenberg (DE); Eloisa Lopez-Calle, Ludwigshafen (DE); Sascha Lutz, Neustadt (DE); Josef Roedl, Mutterstadt (DE); Juergen Spinke, Lorsch (DE); Pamela Espindola, Mannheim (DE); Thomas Manuel Keller, Schifferstadt (DE); Thomas Dolbinow, Dresden (DE); Sabrina Adler, Mannheim (DE); Erik Beiersdorf, Hemsbach (DE); Domenik Wensorra, Mannheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 859 days.

(21) Appl. No.: 17/229,086

(22) Filed: Apr. 13, 2021

(65) Prior Publication Data
US 2021/0229098 A1    Jul. 29, 2021

Related U.S. Application Data

(60) Division of application No. 15/982,009, filed on May 17, 2018, now Pat. No. 11,000,848, which is a
(Continued)

(30) Foreign Application Priority Data
Nov. 26, 2015    (EP) .................................... 15196519

(51) Int. Cl.
*B01L 3/00* (2006.01)
*G01N 35/00* (2006.01)
*G01N 35/10* (2006.01)

(52) U.S. Cl.
CPC ....... *B01L 3/502753* (2013.01); *B01L 3/5023* (2013.01); *B01L 3/502738* (2013.01);
(Continued)

(58) Field of Classification Search
CPC ............ B01L 3/502753; B01L 3/5023; B01L 3/502738; B01L 3/502715; B01L 3/50273;
(Continued)

(56) References Cited

U.S. PATENT DOCUMENTS 5,160,702 A   11/1992   Kopf-Sill et al.
8,114,351 B2   2/2012   Degenhardt
(Continued)

FOREIGN PATENT DOCUMENTS

CN   103480438 A   1/2014
EP   0353592 A2 *   2/1990 .............. B01L 3/508
(Continued)

OTHER PUBLICATIONS

International Search Report and Written Opinion, completed Jan. 23, 2017, pertaining to PCT/EP2016/078916 filed Nov. 25, 2016.

*Primary Examiner* — Samuel P Siefke
*Assistant Examiner* — Valerie Simmons
(74) *Attorney, Agent, or Firm* — Thomas E. Lees, LLC

(57) ABSTRACT

A medical system for determining an analyte quantity in a blood sample via a cartridge that spins around a rotational axis. The cartridge may include: a separation chamber that separates blood plasma from the sample; a processing chamber containing a reagent with a specific binding partner which binds to the analyte to form an analyte specific
(Continued)

binding partner complex; a first valve structure connecting the separation chamber to the processing chamber; a measurement structure to measure the quantity of the analyte, wherein the measurement structure includes a chromatographic membrane with an immobilized binding partner for direct or indirect binding of the analyte or the analyte specific binding partner complex, and an absorbent structure that is nearer to the axis than the membrane; a second valve structure connecting the processing chamber to the measurement structure; and a fluid chamber filled with a washing buffer and fluidically connected to the measurement structure.

3 Claims, 20 Drawing Sheets

Related U.S. Application Data continuation of application No. PCT/EP2016/078916, filed on Nov. 25, 2016.

(52) U.S. Cl.
CPC .. *G01N 35/00069* (2013.01); *B01L 3/502715* (2013.01); *B01L 3/50273* (2013.01); *B01L 2200/0605* (2013.01); *B01L 2200/16* (2013.01); *B01L 2300/0627* (2013.01); *B01L 2300/0803* (2013.01); *B01L 2300/0864* (2013.01); *B01L 2300/0867* (2013.01); *B01L 2300/087* (2013.01); *B01L 2400/0406* (2013.01); *B01L 2400/0409* (2013.01); *B01L 2400/0688* (2013.01); *B01L 2400/084* (2013.01); *G01N 2035/1032* (2013.01)

(58) Field of Classification Search
CPC ..... B01L 2200/0605; B01L 2300/0627; B01L 2400/0406; B01L 2400/0409; B01L 2200/16; B01L 2300/0803; B01L 2300/0864; B01L 2300/0867; B01L 2300/087; B01L 2400/0688; B01L 2400/084; G01N 35/00069; G01N 2035/1032

See application file for complete search history.

(56) References Cited

U.S. PATENT DOCUMENTS

| | | | |
|---|---|---|---|
| 8,759,081 | B2 | 6/2014 | Klaunick et al. |
| 8,911,684 | B2 | 12/2014 | Augstein et al. |
| 9,808,801 | B2 | 11/2017 | Boehm et al. |
| 2006/0194264 | A1* | 8/2006 | Sheppard, Jr. ........ B01L 3/5027 435/7.9 |
| 2009/0137062 | A1* | 5/2009 | Degenhardt ..... G01N 35/00069 422/68.1 |
| 2009/0191643 | A1* | 7/2009 | Boehm ................ B01L 3/5023 436/164 |
| 2009/0246082 | A1 | 10/2009 | Saiki et al. |
| 2010/0081213 | A1* | 4/2010 | Lee .................... B01L 3/50273 436/166 |
| 2011/0094600 | A1* | 4/2011 | Bergeron .......... B01L 3/502738 137/38 |

FOREIGN PATENT DOCUMENTS

| | | |
|---|---|---|
| EP | 2302396 A1 | 3/2011 |
| JP | 2004212050 A | 7/2004 |
| JP | 2010243373 A | 10/2010 |
| WO | 9308893 A1 | 5/1993 |

\* cited by examiner

DETERMINING A QUANTITY OF AN ANALYTE IN A BLOOD SAMPLE

CROSS REFERENCE TO RELATED APPLICATIONS

This application is a divisional of U.S. application Ser. No. 15/982,009, filed May 17, 2018, which is a continuation of International Application No. PCT/EP2016/078916, filed Nov. 25, 2016, which claims priority to European Application No. 15196519.1, filed Nov. 26, 2015 These applications, in their entirety, are incorporated herein by reference.

TECHNICAL FIELD

This application relates to analytical test devices for biological samples, and in particular to the design and use of rotatable cartridges for performing a measurement of a blood sample.

BACKGROUND

Two classes of analysis systems are known in the field of medical analysis: wet analysis systems, and dry-chemical analysis systems. Wet analysis systems, which essentially operate using "wet reagents" (liquid reagents), perform an analysis via a number of required step such as, for example, providing a sample and a reagent into a reagent vessel, mixing the sample and reagent together in the reagent vessel, and measuring and analyzing the mixture for a measurement variable characteristic to provide a desired analytical result (analysis result). Such steps are often performed using technically complex, large, line-operated analysis instruments, which allow manifold movements of participating elements. This class of analysis system is typically used in large medical-analytic laboratories.

On the other hand, dry-chemical analysis systems operate using "dry reagents" which are typically integrated in a test element and implemented as a "test strip", for example. When these dry-chemical analysis systems are used, the liquid sample dissolves the reagents in the test element, and the reaction of sample and dissolved reagent results in a change of a measurement variable, which can be measured on the test element itself. Above all, optically analyzable (in particular colorimetric) analysis systems are typical in this class, in which the measurement variable is a color change or other optically measurable variable. Electrochemical systems are also typical in this class, in which an electrical measurement variable characteristic for the analysis, in particular an electrical current upon application of a defined voltage, can be measured in a measuring zone of the test element using electrodes provided in the measuring zone.

The analysis instruments of the dry-chemical analysis systems are usually compact, and some of them are portable and battery-operated. The systems are used for decentralized analysis (also called point-of-care testing), for example, at resident physicians, on the wards of the hospitals, and in so-called "home monitoring" during the monitoring of medical-analytic parameters by the patient himself (in particular blood glucose analysis by diabetics or coagulation status by warfarin patients).

In wet analysis systems, the high-performance analysis instruments allow the performance of more complex multi-step reaction sequences ("test protocols"). For example, immunochemical analyses often require a multistep reaction sequence, in which a "bound/free separation" (hereafter "b/f separation"), i.e., a separation of a bound phase and a free phase, is necessary. According to one test protocol, for example, the sample can first be brought in contact with a specific binding reagent for the analyte which is immobilized onto a surface. This can be achieved for example by mixing the sample with beads comprising surfaces with such immobilized reagents or transporting the sample over surfaces or through porous matrices wherein the surfaces or the porous matrices comprise coatings of the immobilized reagents. A marking reagent can subsequently be brought in contact with this surface in a similar manner to mark the bound analyte and allow its detection. To achieve a more precise analysis, a subsequent washing step is often performed, in which unbound marking reagent is at least partially removed. Numerous test protocols are known for determining manifold analytes, which differ in manifold ways, but which share the feature that they require complex handling having multiple reaction steps, in particular also a b/f separation possibly being necessary.

Test strips and similar analysis elements normally do not allow controlled multistep reaction sequences. Test elements similar to test strips are known, which allow further functions, such as the separation of red blood cells from whole blood, in addition to supplying reagents in dried form. However, they normally do not allow precise control of the time sequence of individual reaction steps. Wet-chemical laboratory systems offer these capabilities, but are too large, too costly, and too complex to handle for many applications.

To close these gaps, analysis systems have been suggested which operate using test elements which are implemented in such a manner that at least one externally controlled (i.e., using an element outside the test element itself) liquid transport step occurs therein ("controllable test elements"). The external control can be based on the application of pressure differences (overpressure or low-pressure) or on the change of force actions (e.g., change of the action direction of gravity by attitude change of the test element or by acceleration forces). The external control can be performed by centrifugal forces, which act on a rotating test element as a function of the velocity of the rotation.

Analysis systems having controllable test elements are known and typically have a housing, which comprises a dimensionally-stable plastic material, and a sample analysis channel enclosed by the housing, which often comprises a sequence of multiple channel sections and chambers expanded in comparison to the channel sections lying between them. The structure of the sample analysis channel having its channel sections and chambers is defined by profiling of the plastic parts. This profiling is able to be generated by injection molding techniques or hot stamping. However, microstructures, which are generated by lithography methods, are increasingly being used more recently.

Analysis systems having controllable test elements allow the miniaturization of tests which have only been able to be performed using large laboratory systems. In addition, they allow the parallelization of procedures by repeated application of identical structures for the parallel processing of similar analyses from one sample and/or identical analyses from different samples. It is a further advantage that the test elements can typically be produced using established production methods and that they can also be measured and analyzed using known analysis methods. Known methods and products can also be employed in the chemical and biochemical components of such test elements.

In spite of these advantages, there is a further need for improvement. In particular, analysis systems which operate using controllable test elements are still too large. The most compact dimensions possible are of great practical significance for many intended applications.

United States patent application US 2009/0191643 A1 describes a test element and method for detecting an analyte with the aid thereof is provided. The test element is essentially disk-shaped and flat, and can be rotated about a preferably central axis which is perpendicular to the plane of the disk-shaped test element. The test element has a sample application opening for applying a liquid sample, a capillary-active zone, in particular a porous, absorbent matrix, having a first end that is remote from the axis and a second end that is near to the axis, and a sample channel which extends from an area near to the axis to the first end of the capillary-active zone that is remote from the axis.

United States patent U.S. Pat. No. 8,759,081 B2 discloses a test element, analytical system and method for optical analysis of fluid samples is provided. The test element has a substrate and a microfluidic channel structure, which is enclosed by the substrate and a cover layer. The channel structure has a measuring chamber with an inlet opening. The test element has a first level, which faces the cover layer, and a second level, which interconnects with the first level such that the first level is positioned between the cover layer and the second level. A part of the measuring chamber extending through the first level forms a measuring zone connecting with a part of the measuring chamber that extends partially into the second level, forming a mixing zone. Optical analysis of fluid samples is carried out by light guided through the first level parallel to the cover layer, such that the light traverses the measuring zone along an optical axis.

United States patent U.S. Pat. No. 8,911,684 B2 discloses a microfluidic element for analyzing a bodily fluid sample for an analyte contained therein is provided, the element having a substrate, a channel structure that is enclosed by the substrate, and a cover layer, and is rotatable around a rotational axis. The channel structure of the microfluidic element includes a feed channel having a feed opening, a ventilation channel having a ventilation opening, and at least two reagent chambers. The reagent chambers are connected to one another via two connection channels in such a manner that a fluid exchange is possible between the reagent chambers, one of the reagent chambers having an inlet opening, which has a fluid connection to the feed channel, so that a liquid sample can flow into the rotational-axis-distal reagent chamber. At least one of the reagent chambers contains a reagent, which reacts with the liquid sample.

SUMMARY

The present application discloses herein a method and a medical system in the independent claims. Embodiments are given in the dependent claims.

A cartridge as used here encompasses also any test element for processing a biological sample into a processed biological sample. The cartridge may include structures or components which enable a measurement to be performed on the biological sample. A typical cartridge is a test element as is defined and explained in U.S. Pat. No. 8,114,351 B2 and US 2009/0191643 A1. A cartridge as used herein may also be referred to as a Centrifugal microfluidic disc, also known as "lab-on-a-disc", lab-disk or a microfluidic CD.

A biological sample as used herein encompasses as chemical product derived, copied, replicated, or reproduced from a sample taken from an organism. A blood sample is an example of a biological sample that is either whole blood or a blood product. The blood plasma may be considered to be a processed biological sample.

It is understood that references to blood samples and products below and in the claims may be modified such that they refer to biological samples.

In one aspect, an embodiment of the invention provides for a method of determining a quantity of an analyte in a blood sample using a cartridge. A quantity as used herein may refer to an absolute quantity (amount) of an analyte that is measured within the sample and may be given in units like gram or mol. In some examples the absolute quantity of an analyte may be calibrated to the amount of solvent (weight or volume) and will result in a concentration of the analyte in the blood sample given in units like gram/ml or mol/l. As such the term quantity in the claims and/or disclosure may be replaced with the term "concentration."

The cartridge is operable for being spun around a rotational axis. The cartridge comprises an inlet for receiving a blood sample. The cartridge further comprises a blood separation chamber for separating blood plasma from the corpuscular blood sample components by centrifugation. The United States Patent US 2009/0191643 A1 illustrates a microfluidic structure in a rotational disc that is able to separate serum or plasma from the blood cell fraction (mainly the erythrocytes) of a whole blood sample.

The cartridge further comprises a processing chamber containing at least one reagent. The at least one reagent comprises at least one specific binding partner which is operable to bind with the analyte to form at least one analyte-specific binding partner complex. The cartridge further comprises a first valve structure connecting the blood separation chamber to the processing chamber. The cartridge further comprises a measurement structure for enabling the measurement of the quantity of an analyte. The measurement structure comprises a chromatographic membrane. The chromatographic membrane comprises an immobilized binding partner for direct or indirect binding of the analyte or the at least one analyte-specific binding partner complex. The measurement structure further comprises an absorbent structure. The absorbent structure is nearer to the rotational axis than the membrane. The absorbent structure may support the complete transport of the processed fluid across or through the chromatographic membrane and may also serve as a waste-fleece by binding the processed fluids and/or additional fluids like washing buffers, thus avoiding their leakage and thereby contamination of the instrument or user.

The cartridge further comprises a second valve structure connecting the processing chamber to the measurement structure. The cartridge further comprises a fluid chamber filled with a washing buffer. The fluid chamber is fluidically connected to the measurement structure. A seal keeps the washing buffer within the fluid chamber.

The method comprises placing the blood sample into the inlet. The method further comprises rotating the cartridge about the rotational axis to transport the blood sample into the blood separation chamber. The method further comprises controlling the rotation of the cartridge about the rotational axis to separate the blood plasma from the corpuscular blood sample components by centrifugation. The method further comprises opening the first valve structure and rotating the cartridge about the rotational axis to transport a defined portion of the blood plasma from the blood separation chamber to the processing chamber. In different examples the valve structure may take different forms. In one example the first valve structure is a siphon. This may be structured such that opening the valve structure comprises reducing the rotational rate of the cartridge so that fluid is able to enter and pass through the siphon by capillary forces. In other examples the first valve structure may be for example a hydrophobic valve, a wax valve, a mechanical valve or a magnetic valve.

The method further comprises holding the portion of the blood plasma in the processing chamber. The blood plasma mixes with the reagent and combines with the at least one specific binding partner to form the at least one analyte-specific binding partner complex.

The method further comprises releasing the seal to enable a first part of the washing buffer to enter the measurement structure.

The method further comprises opening the second valve structure to transfer the at least one analyte-specific binding partner complex to the measurement structure and controlling the rotational rate of cartridge to allow the at least one analyte-specific binding partner complex to flow to the measurement structure through the second valve structure. If the second valve structure is a siphon then the process of opening the second valve and controlling the rotational rate may be identical. In other examples the second valve structure may be one of the alternative valve structures described for the first valve structure. In this case the second valve structure may in some examples be opened before the rotational rate of the cartridge is controlled. In other examples the opening of the second valve structure and the controlling of the rotational rate of the cartridge are performed at the same time.

The method further comprises controlling the rotational rate of the cartridge to allow the at least one analyte-specific binding partner complex to flow across the membrane to the absorbent structure at a defined velocity and to allow the at least one analyte-specific binding partner complex to bind to the immobilized binding partner.

The method further comprises controlling the rotational rate of the cartridge to allow the first part of the washing buffer to flow across the membrane to the absorbent structure at a defined velocity.

The method further comprises performing the measurement using the membrane and using the optical measurement system to measure the quantity of the analyte.

In some examples, the reagent contained in the processing chamber may be a dry chemical formulation. In other examples the reagent may be in the form of a liquid.

In some examples, the reagent can be located within the processing chamber in different ways: coated onto the surface of the processing chamber, coated onto the surface of beads which are added into the processing chamber, added as a lyophilisate/powder, added as capsules, added as a matrix (e.g. paper) comprising the dissolvable reagent and/or vesicles.

The chromatographic membrane may be referred to as a capillary-active zone. In one embodiment, the capillary-active zone comprises a porous, absorbent matrix. In one embodiment of the test element according to the invention, the second end of the capillary-active zone near to the axis adjoins a further absorbent material or an absorbent structure such that it can take up liquid from the capillary-active zone. The capillary-active zone and the further absorbent material typically slightly overlap for this purpose. The further material or the further absorbent structure serve on the one hand, to assist the suction action of the capillary-active zone and in particular of the porous, absorbent matrix and, on the other hand, serve as a holding zone for liquid which has already passed through the capillary-active zone. In this connection the further material can consist of the same materials or different materials than the matrix. For example, the matrix can be a membrane and the further absorbent material can be a fleece or a paper. Other combinations are of course equally possible.

The test element according to one embodiment is characterized in one embodiment by the fact that the sample channel contains zones of different dimensions and/or for different functions. For example, the sample channel can contain a zone which contains reagents that are soluble in the sample or can be suspended in the sample. These reagents can be dissolved or suspended in the liquid sample when it flows into or through the channel and can react with the analyte in the sample or with other sample components.

The different zones in the sample channel can also differ in that there are zones with capillary activity and those without capillary activity. Moreover, there may be zones having a high hydrophilicity and those with a low hydrophilicity. The individual zones can quasi seamlessly merge into one another or be separated from one another by certain barriers such as valves and in particular non-closing valves such as geometric valves, siphons or hydrophobic barriers.

The test element may contain a reagent zone which contains a conjugate of an analyte binding partner (typically an antibody or an immunologically active antibody fragment capable of analyte binding if the analyte is an antigen or hapten, or an antigen or hapten if the analyte is an antibody) and a label which can be detected directly or indirectly by visual, optical or electrochemical means, wherein the conjugate can be dissolved by the liquid sample. Suitable labels are, for example, enzymes, fluorescent labels, chemiluminescent labels, electrochemically active groups or so-called direct labels such as metal or carbon labels or colored latices. This zone may also be referred to as the conjugate zone.

The conjugate zone can serve also as a sample application zone or a separate sample application zone can be located on the test element. The conjugate zone can, in addition to the conjugate of analyte binding partner and label described above, also contain an additional conjugate of a second analyte binding partner (which is in turn typically an antibody or an immunologically active antibody fragment capable of analyte binding) and a tagging substance which is itself a partner in a binding pair. The tagging substance can for example be biotin or digoxigenin and can be used to immobilize a sandwich complex consisting of labelled conjugate, analyte and tagged conjugate in the detection and/or control zone.

The test element may additionally comprise a detection zone which contains a permanently immobilized binding partner (i.e., one that cannot be detached by the liquid sample) for the analyte or for complexes containing the analyte. The immobilized binding partner is in turn typically an antibody or an immunologically active antibody fragment capable of analyte binding or an antigen or (poly) hapten. If one of the above-mentioned tagged conjugates is used which for example comprises biotin or digoxigenin together with an analyte binding partner, the immobilized binding partner can also be streptavidin or polystreptavidin and an anti-digoxigenin antibody.

Finally, there may also be a control zone in or on the test element which contains a permanently immobilized binding partner for the conjugate of analyte binding partner and label for example in the form of an immobilized polyhapten which acts as an analyte analogue and is able to bind the analyte binding partner from the labelled conjugate. It is important for the invention that the control zone may additionally contain one or more permanently immobilized binding partner(s) for the analyte or for complexes containing the analyte. The latter binding partners can be selected from the same compounds which were described above in connection with the immobilized binding partners of the detection zone. These immobilized binding partners in the detection zone and in the control zone are typically identical. They may, however, also be different for example in that a binding partner for a biotin-tagged conjugate (hence, e.g., polystreptavidin) is immobilized in the detection zone and an anti-analyte antibody is immobilized in the control zone in addition to the polyhapten. In the latter case the anti-analyte antibody that is additionally immobilized in the control zone should be directed against (another) independent epitope and thus one that is not recognized by the conjugate antibodies (biotin-tagged conjugate and labelled conjugate).

The capillary-active zone is typically a porous, absorbent matrix and in particular can be a paper, a membrane, a micro-structured polymer structure (e.g. comprising microstructured pillars) or a fleece.

The capillary-active zone and in particular the porous, absorbent matrix can contain one or more zones containing immobilized reagents.

Specific binding reagents for example specific binding partners such as antigens, antibodies, (poly) haptens, streptavidin, polystreptavidin, ligands, receptors, nucleic acid strands (capture probes) are typically immobilized in the capillary-active zone and in particular in the porous, absorbent matrix. They are used to specifically capture the analyte or species derived from the analyte or related to the analyte from the sample flowing through the capillary-active zone. These binding partners can be present immobilized in or on the material of the capillary-active zone in the form of lines, points, patterns or they can be indirectly bound to the capillary-active zone e.g., by means of so-called beads. Thus, for example, in the case of immunoassays one antibody against the analyte can be present immobilized on the surface of the capillary-active zone or in the porous, absorbent matrix which then captures the analyte (in this case an antigen or hapten) from the sample and also immobilizes it in the capillary-active zone such as, e.g., the absorbent matrix. In this case the analyte can be made detectable for example by means of a label that can be detected visually, optically or fluorescence-optically by further reactions, for example by additionally contacting it with a labelled bindable partner.

In another embodiment, the cartridge further comprises an aliquoting chamber. The cartridge further comprises a fluid duct connecting the fluid chamber with the aliquoting chamber. The cartridge further comprises a metering chamber. The cartridge further comprises a connecting duct which fluidically connects the metering chamber with the aliquoting chamber. The measurement structure is connected to the metering chamber via a third valve structure. The fluidic elements may have any of the alternative forms identified for the first and second valve structures. The cartridge further comprises a vent connected to the metering chamber. The vent is nearer to the rotational axis than the metering chamber.

The step of releasing the seal enables the washing buffer to enter the aliquoting chamber. The method further comprises the step of controlling the rotational rate of the cartridge to enable the washing buffer in the aliquoting chamber to transfer into the connecting duct and to fill the metering chamber a first time. The method further comprises controlling the rotational rate of the cartridge to transfer the first part of the washing buffer from the metering chamber through the valve into the measurement structure and to transfer a first remaining part back into the aliquoting chamber.

The method further comprises the step of controlling the rotational rate of the cartridge to allow the washing buffer in the aliquoting chamber to transfer into the connecting duct and to fill the metering chamber a second time. The method further comprises the step of controlling the rotational rate of the cartridge to transfer a second part of the washing buffer from the metering chamber through the valve into the measurement structure and to transfer a second remaining part back into the aliquoting chamber. The method further comprises the step of controlling the rotational rate of the cartridge to allow the second part of the washing buffer to flow across the membrane to the absorbent structure. The use of the structure described above may be beneficial because it may provide accurately metered amounts of washing buffer to be used in subsequent washing steps. This may also be beneficial because it is not necessary to add fluid to the cartridge using a pipetting system or other means in order to have multiple steps of using the washing buffer.

In another embodiment, the processing chamber contains a first specific binding partner of the analyte with a detectable label and a second specific binding partner with a capture label. These both form a binding complex in with the analyte. This may consist of a first specific binding partner, a second specific binding partner and an analyte. This may additionally provide for a measurement structure within the immobilized binding partner specific to the capture label of the second specific binding partner.

In another embodiment the detection is fluorescence-based. In another embodiment the label is particle-based fluorescent label.

In another embodiment the measurement structure contains an optical calibration zone. The optical calibration zone may for example be a region on the measurement structure which contains a defined amount of the immobilized label and provides a means for checking if the optics of the instrument is functioning properly and if not, to calibrate it adequately. In other embodiments, the optical calibration zone is located at different locations on the test element.

In another embodiment the measurement structure contains a reagent and flow control zone. This may provide for a means of checking if the cartridge is functioning properly in terms of reagents and immunochromatography. There may be for example two different control zones, a reagent/flow-control and an optical calibration zone as instrument control zone for correcting the intensity of the radiation or excitation source when an optical measurement is made. In another embodiment the measurement is the measurement of a concentration of cardiac troponin.

In another embodiment each of the at least one reagent is dry. The use of dry reagents may be beneficial because they may be stored directly on the test element in a stable manner and provide accurate results after being stored large period of time.

In another embodiment each of the at least one reagent is provided in a dry-chemical formulation. The use of dry reagents may be beneficial because they may be stored directly on the test element in a stable manner and provide accurate results even after being stored a large period of time.

In another aspect, an embodiment of the invention provides for a medical system for determining a quantity of an analyte in a blood sample using a cartridge. The medical system comprises the cartridge. The cartridge is operable for being spun around a rotational axis. The cartridge comprises an inlet for receiving a blood sample. The cartridge further comprises a blood separation chamber for separating blood plasma from the corpuscular blood sample by centrifugation. The blood separation chamber is fluidically connected to the inlet. The cartridge further comprises a processing chamber containing at least one reagent. The at least one reagent comprises at least one specific binding partner which is operable to bind with the analyte to form at least one analyte-specific binding partner complex. The cartridge further comprises a first valve structure connecting the blood separation chamber to the processing chamber. The cartridge further comprises a measurement structure for enabling measurement of the quantity of the analyte.

The measurement structure comprises a chromatographic membrane. The chromatographic membrane comprises an immobilized binding partner for direct or indirect binding of the analyte or the at least one analyte-specific binding partner complex. The measurement structure further comprises an absorbent structure. The absorbent structure is nearer to the rotational axis than the membrane. The cartridge further comprises a second valve structure connecting the processing chamber to the measurement structure. The cartridge further comprises a fluid chamber filled with a washing buffer. The fluid chamber is fluidically connected to the measurement structure. A seal keeps the washing buffer within the fluid chamber.

The cartridge further comprises an aliquoting chamber. The cartridge further comprises a fluid duct connecting the fluid chamber with the aliquoting chamber. The cartridge further comprises a metering chamber. The cartridge further comprises a connecting duct which fluidically connects the metering chamber with the aliquoting chamber. The measurement structure is connected to the metering chamber via a third valve structure. The cartridge further comprises a vent connected to the metering chamber. The vent is nearer to the rotational axis than the metering chamber.

In another aspect, the metering chamber has sidewalls and a central region. The sidewalls taper away from the central region. The capillary action next to the sidewalls of the metering chamber is greater than in the central region of the metering chamber. This may facilitate the filling of the metering chamber with the reduced chance of being bubbles within the metering chamber. This may result in a more accurate metering of fluid dispensed from the metering chamber.

In another embodiment, the metering chamber is operable for causing fluid to fill the metering chamber using capillary action. The connecting duct comprises a duct entrance in the aliquoting chamber. The connecting duct further comprises a duct exit in the metering chamber. The duct exit is closer to the rotational axis than the duct entrance. The connecting duct is operable for causing fluid to flow to the metering chamber using capillary action. This embodiment may be beneficial because it may provide for an accurate way of providing multiple aliquotations per fluid which are metered accurately.

In another embodiment the connecting duct comprises a duct entrance in the aliquoting chamber. The connecting duct further comprises a duct exit in the metering chamber. A circular arc about the rotational axis passes through both the duct entrance and the duct exit. This embodiment may be beneficial because it may provide a very effective means of providing multiple volumes of buffer fluid which are accurately metered.

In another embodiment, the cartridge further comprises an overflow chamber connected to the blood separation chamber. The overflow chamber comprises an opening. The first siphon comprises a siphon entrance in the blood separation chamber. The first siphon comprises a siphon exit in the processing chamber. The opening is closer to the rotational axis than the siphon exit. The siphon entrance can be closer to the rotational axis than the siphon exit. This embodiment may have the benefit that all of the fluid from the blood separation chamber is transferred to the processing chamber.

In another embodiment, the cartridge further comprises an overflow chamber connected to the blood separation chamber. The overflow chamber comprises an opening. The first siphon comprises a siphon entrance in the blood separation chamber. The first siphon comprises a siphon exit in the processing chamber. The opening is closer to the rotational axis than the siphon exit. The siphon exit can be closer to the rotational axis than the siphon entrance. This embodiment may have the benefit that not all of the fluid from the blood separation chamber is transferred to the processing chamber. This may reduce the amount of fatty materials in the blood plasma which are transferred to the processing chamber. This may result in a higher quality analysis than would be performed if the siphons were in a different location.

In another embodiment the first siphon comprises a nearest location that is closes to the rotational axis. The distance of the first siphon to the rotational axis changes monotonically between the siphon entrance and the nearest location. The distance of the first siphon to the rotational axis changes monotonically between the siphon exit and the nearest location.

In another embodiment the processing chamber comprises at least two sub-processing chambers. Each of the at least two sub-processing chambers are fluidically connected by an intermediate valve structure. The intermediate valve structure may be any of the alternate valve structure types discussed for the first or second valve structure. The processing chamber contains two or more reagents. Each of the at least two sub-processing chambers contains a portion of the two or more reagents. The two or more reagents may be divided into distinct reagent regions within each of the two sub-processing chambers or there may be a mixture of the two or more reagents within both of the sub-processing chambers. This embodiment may be advantageous because it enables the blood plasma to be processed by different reagents in a sequential order. This may enable more complicated tests to be performed with the cartridge. The use of two or more sub-processing chambers for storing different reagents can also be advantageous if reagents have to be stored on the cartridge which would react with each other because by the spatial split of the different reagents into different sub-processing chambers an unintentional reaction between the reagents could be prevented.

In another embodiment, the medical system further comprises a cartridge spinner for controlling the rotation of the cartridge about the rotational axis.

In another embodiment, the medical system comprises a memory for storing machine-executable instructions and a processor for controlling the medical system. Execution of the machine-executable instructions causes the processor to rotate the cartridge about the rotational axis to transport the blood sample into the blood separation chamber by controlling the cartridge spinner. Execution of the machine-executable instructions further causes the processor to control the rotation of the cartridge about the rotational axis to separate the blood plasma from the corpuscular blood sample components by centrifugation by controlling the cartridge spinner. Execution of the machine-executable instructions further causes the processor to open the first valve structure and rotate the cartridge about the rotational axis to transport a defined portion of the blood plasma from the blood separation chamber to the processing chamber by controlling the cartridge spinner. In the case where the first valve structure is a siphon then both the opening and the rotation of the cartridge can be performed by controlling the cartridge spinner. If the first valve structure is another sort of valve such as a wax or mechanical valve or mechanical valve then a valve opening mechanism may be controlled by the processor to achieve this. This is also true of any of the other valve structures which are mentioned herein.

Execution of the machine-executable instructions further causes the processor to hold the portion of the blood plasma in the processing chamber. This may be achieved by controlling the cartridge spinner. The blood plasma mixes with the reagent and combines with the at least one specific binding partner to form the at least one analyte-specific binding partner complex. Execution of the machine-executable instructions further causes the processor to release the seal to enable a first part of the washing buffer to enter the measurement structure. This for example may be performed by the processor controlling a seal opener which is an apparatus or mechanism which actuates the cartridge such as to open the seal.

Execution of the machine-executable instructions further causes the processor to open the second valve structure to transfer the at least one analyte specific binding partner complex to the measurement structure and controlling the rotational weight of the cartridge to allow the at least one analyte-specific binding partner complex to flow to the measurement structure through the second valve structure. This may be achieved for example by controlling the rotational rate of the cartridge with the cartridge spinner. Execution of the machine-executable instructions further causes the processor to control the rotational rate of the cartridge by controlling the cartridge spinner to allow the at least one analyte-specific binding partner complex to flow across the membrane to the absorbent structure at a defined velocity and to allow the at least one analyte-specific binding partner complex to bind to the mobilized binding partner. This step may also be achieved by controlling the rotational rate of the cartridge with the cartridge spinner by the processor.

Execution of the machine-executable instructions further allows the processor to control the rotational rate of the cartridge to allow the first part of the washing buffer to flow across the membrane to the absorbent structure at a defined velocity. The rotational rate of the cartridge may be controlled using the cartridge spinner. Execution of the machine-executable instructions further causes the processor to perform the measurement using the membrane and using the optical measurement system for the analyte quantization.

In another embodiment, the medical system further comprises a seal opener. For example, the processor may be able to control the seal opener automatically. Execution of the machine-executable instructions causes the processor to control the seal opener to release the seal to enable the washing buffer to enter the aliquoting chamber before decreasing the rotational rate of the cartridge to admit the washing buffer in the aliquoting chamber to transfer into the connecting duct and to fill the metering chamber a first time.

In another embodiment the first valve structure is a first siphon. In another embodiment the second valve structure is a second siphon. In another embodiment the third valve structure is a third siphon.

In another embodiment, the medical system further comprises an optical measurement system for performing the measurement using the membrane. In another embodiment, the optical measurement system is a fluorescence-based detector. The fluorescence-based detector for example may be a spectrometer or a monochromator in some examples. In another embodiment, the medical system further comprises a temperature controller for maintaining the temperature of the cartridge within a predetermined temperature range. This may be beneficial because the measurement and the reagents may function better or at a controlled rate if the temperature is accurately controlled.

In another embodiment, the fluid chamber is contained within the cartridge. In another embodiment, the seal of the fluid chamber is a foil which may be pierced by a lancing structure. In another embodiment, the fluid chamber is within a blister pack or blister packaging. The blister may be depressed and the increase in pressure may cause the seal to break releasing the fluid in the fluid reservoir. In another embodiment, the absorbent structure is a waste fleece. In another embodiment, the fluid chamber is a blister packet wherein the blister packet comprises a flexible wall. Depressing the flexible wall may cause the seal to open.

In another embodiment, the cartridge is molded or formed from plastic. There may be a cover which is attached to the molded portion.

In another embodiment, the blood separation chamber is also used to determine the hematocrit of the blood sample after the completion of the separation of blood plasma from the corpuscular blood sample components. In one example this can be done by optical determination of the volume filled by the corpuscular blood sample components in the rotational axis-distant parts of the blood separation chamber of the after centrifugation of the test element and of the volume filled by blood plasma in the rotational axis-near parts of the blood separation chamber of the after centrifugation of the test element. These two volumes can be correlated to each other to obtain a parameter which relates to the hematocrit of the blood sample.

In another example, the analyte quantitation is performed without any washing steps. Method steps detailing controlling the rotational rate of the cartridge to control the flow of washing buffer across the chromatographic membrane to the absorbent structure at a defined velocity may therefore be deleted from the claims.

In another embodiment, a preliminary value for the analyte quantitation is generated by performing an optical measurement after the chromatography of the processed sample before washing the membrane with the washing buffer. This may give an indication for a high analyte concentration within the sample and allows sending an early alarm to the user in case of high analyte quantity or concentration. In another example, the analyte quantitation is performed by using serum, plasma or urine as sample. Regarding the different immunoassay formats we can also refer to US 2009/0191643 for more details.

It is understood that one or more of the aforementioned embodiments and/or examples of the invention may be combined as long as the combined embodiments are not mutually exclusive.

It is also understood that method steps and/or actions performed by the processor in response to the machine executable instructions may be performed in different orders as long as the re-arrangement does not lead to a self contradictory order of actions or method steps. In particular, the steps (and equivalent actions performed by the processor) of opening the second valve structure to transfer the at least one analyte specific binding partner complex to the measurement structure and controlling the rotational rate of the cartridge to allow the at least one analyte specific binding partner complex to flow to the measurement structure through the second valve structure and of controlling the rotational rate of the cartridge to allow the at least one analyte specific binding partner complex to flow across the membrane to the absorbent structure at a defined velocity and to allow the at least one analyte specific binding partner complex to bind to the immobilized binding partner; may be performed before releasing the seal to enable a first part of the washing buffer to enter the measurement structure.

It is also understood that method steps and/or actions performed by the processor in response to the machine executable instructions are not limited to the particular order as described above and as is defined in the claims.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
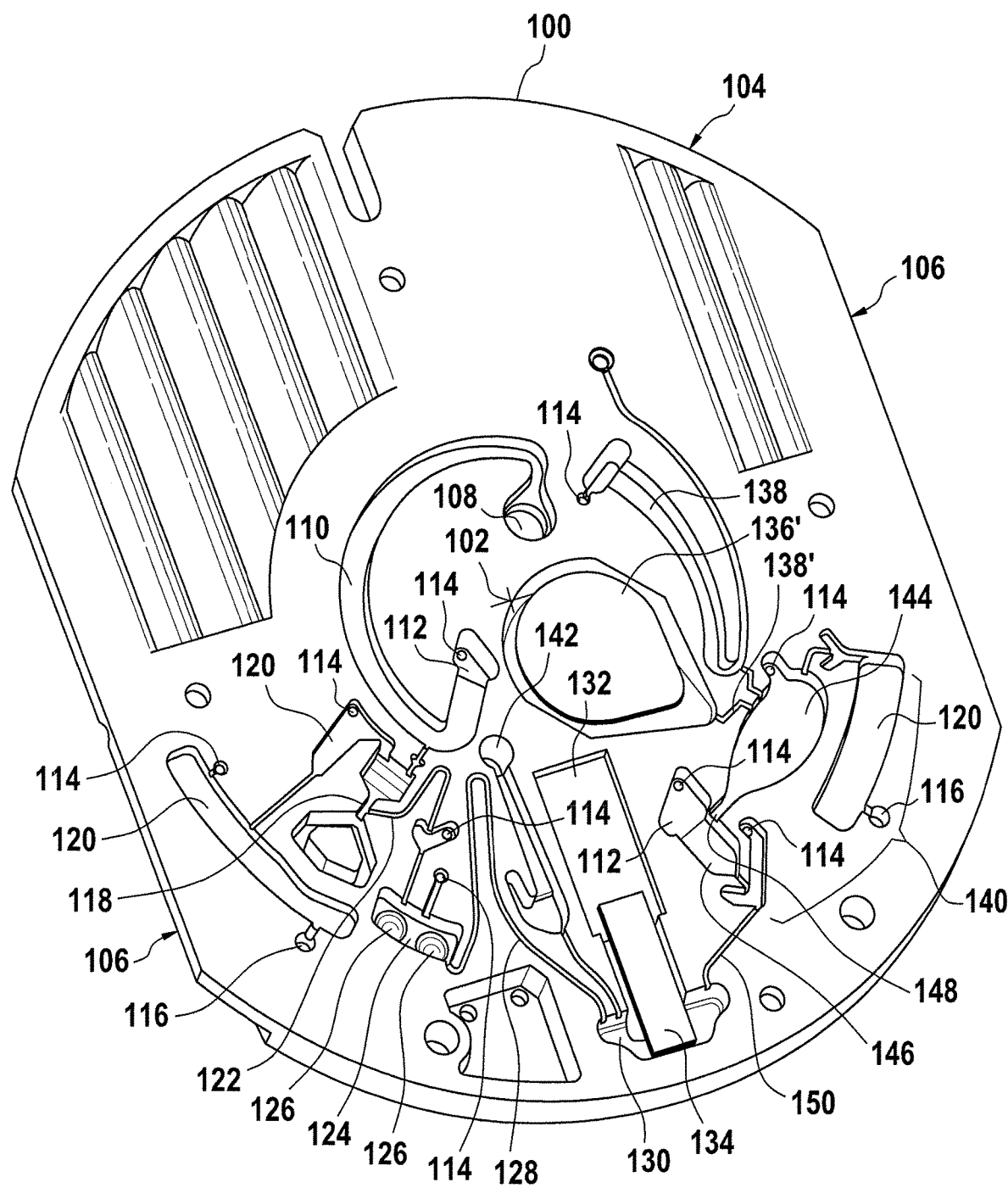
FIG. 1 illustrates an example of a cartridge.
Figure 2:
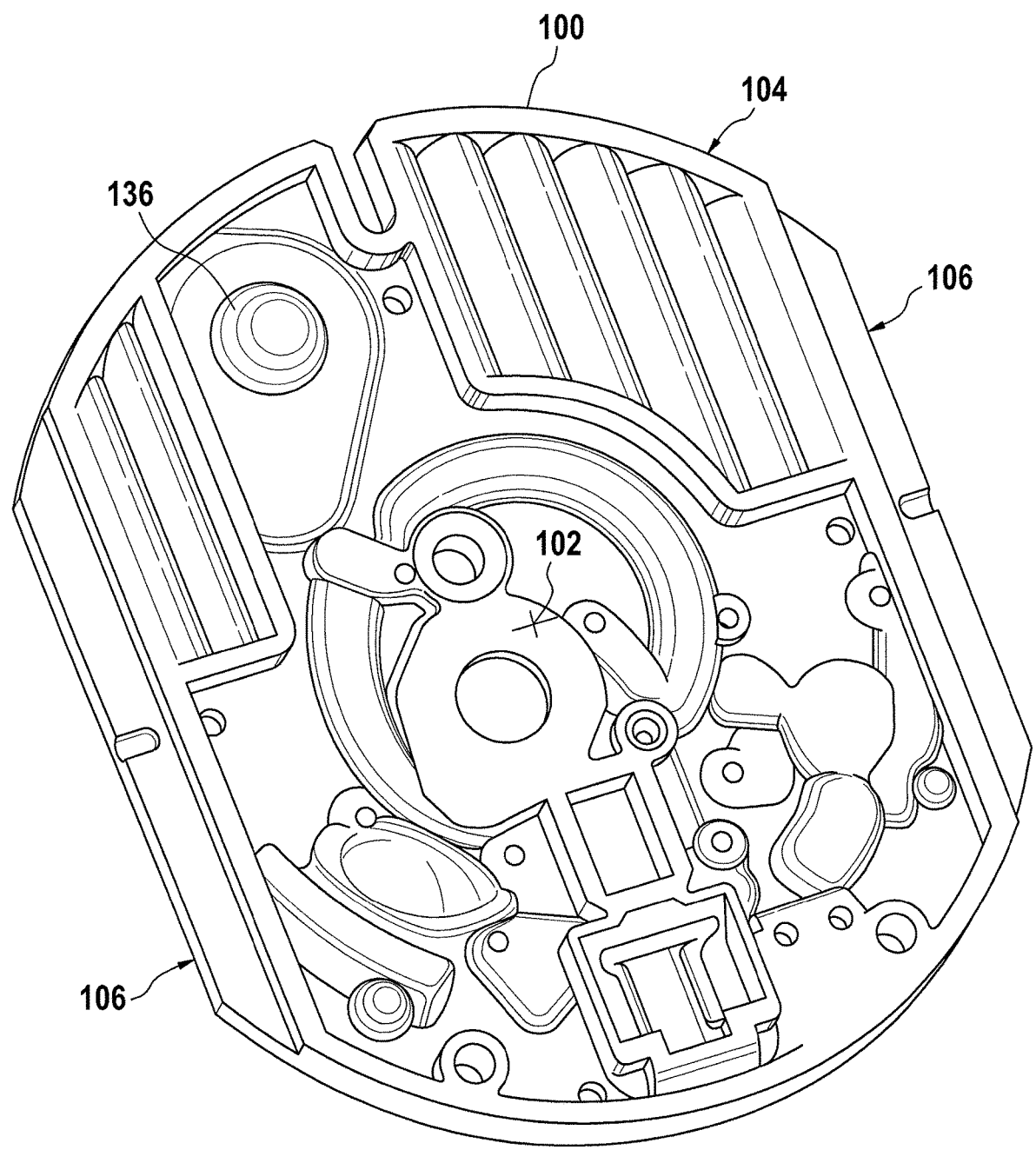
FIG. 2 shows a further view of the cartridge of FIG. 1.

FIGS. 1 and 2 show an example of a cartridge 100. FIG. 1 shows a front view of the cartridge 100. FIG. 2 shows a backside view of the cartridge 100. The cartridge is adapted for rotating around a rotational axis 102. The cartridge 100 is predominantly flat and has an outer edge perpendicular to the rotational axis 102. The outer edge 104 is less than a particular radius and is predominantly circular in shape. In the embodiment shown in FIGS. 1 and 2 there are also several optional flat portions 106 of the outer edge. These may aid in gripping or storing the cartridge 100. In alternative embodiments such flat portions are lacking and the overall outer edge of the cartridge is predominantly circular in shape. The cartridge 100 could for example be made out of molded plastic. There may be a cover which is placed on the surface of the structure shown in FIG. 1. The cover is not shown so as to aid the view of the microfluidic structure within the cartridge 100.

The cartridge 100 is shown as having a blood inlet 108 where a blood sample can be added or pipetted into the cartridge 100. The blood inlet 108 may for example comprise a storage chamber 110 for storing a volume of a blood sample. The storage chamber 110 is shown as having an expansion chamber 112 with a vent 114. The various microfluidic structures may be shown as having expansion chambers 112 and vents 114 also. There may also be failsafe indicators 116 which are regions of the microfluidic structure which fill with fluid to indicate that a microfluidic structure has received a sufficient amount of fluid or sample. These for example may be checked optically during the use of the cartridge 100. These in some cases are labeled but are not discussed herein. The blood inlet 108 is shown as being fluidically connected to a blood separation chamber 118. The blood separation chamber 118 is used to separate the plasma from the corpuscular blood sample components (blood cells) in a blood sample. The blood separation chamber 118 is shown as also being connected to an overflow chamber 120 that accepts an excess of plasma from the blood sample. The functioning of the blood separation chamber 118 will be described in more detail below. The blood separation chamber 118 is connected to a processing chamber 124 via a first valve structure 122.

In this example the first valve structure 122 is a siphon. It could however include other structures such as a mechanical, magnetic, or thermally activated valve. The processing chamber 124 is shown as containing several surfaces 126 which could be used for storing a dry reagent. In other examples there may be amounts of liquid or other types of reagent which can be mixed with a plasma sample. The processing chamber 124 is shown as being connected to a measurement structure 130 via a second valve structure 128. In this example the second valve structure 128 is a siphon. The second valve structure 128 could take any of the forms that the first valve structure 122 can also take. In this example the processing chamber 124 is shown as being a single chamber. In another example the processing chamber 124 may comprise several sub-chambers so that a plasma sample can be processed by different reagents sequentially. The measurement structure 130 is shown as containing a chromatographic membrane 134 and in contact with the rotational axis-nearer end of the chromatographic membrane an additional absorbent structure 132 which serves as a waste fleece. The reagents and the chromatographic membrane 134 are discussed in greater detail below.

After being processed with a reagent the plasma sample may be wicked or transported across the chromatographic membrane 134. Before and/or after a washing buffer may be used to prime or wash the chromatographic membrane 134. The cartridge 100 shown in FIGS. 1 and 2 is a cartridge which incorporates a number of distinct optional features. On the backside of the cartridge 100 is shown a fluid chamber 136. In this example the fluid chamber 136 is a blister pack or flexible fluid chamber which can be compressed from outside of the cartridge 100. When the fluid chamber 136 is compressed a seal is broken which allows fluid within the fluid chamber 136 to enter a fluid duct 138. The fluid duct 138 then transports fluid to a metering structure 140.

The metering structure 140 enables the washing buffer to be supplied to the measurement structure 130 multiple times in precisely measured amounts. The metering structure 140 is however not necessary. There may be examples where the washing buffer is delivered directly to the measurement structure 130. In other examples the measurement structure is not primed with the washing buffer before the test is performed. The structure labeled 136' is an alternate fluid chamber. The fluid chamber 136' may be mechanically actuated to break a seal around its perimeter which causes fluid to enter the metering structure 140 via the fluid duct 138'. The cartridge 100 is also shown as containing another optional structure. The structure labeled 142 is a manual fill location where a reagent or buffer solution may be added manually to the measurement structure 130 or by an external source like a dispenser.

The metering structure 140 is shown as containing an aliquoting chamber 144. The aliquoting chamber 144 receives the fluid from the fluid chamber 136 or 136'. The aliquoting chamber 144 is connected to a metering chamber 146 via a connecting duct 148. The metering structure 146 is used to accurately meter the buffer fluid and supply metered aliquots of the fluid one or more times to the measurement structure 130. The metering structure 146 is connected to the measurement structure 130 via a fluidic element 150. In this case the fluidic element 150 is shown as containing a microfluidic duct or channel and a chamber for holding a quantity of the buffer fluid as it is being metered. The function of the metering structure 140 and several alternatives will be discussed with reference to later Figs.

Figure 3:
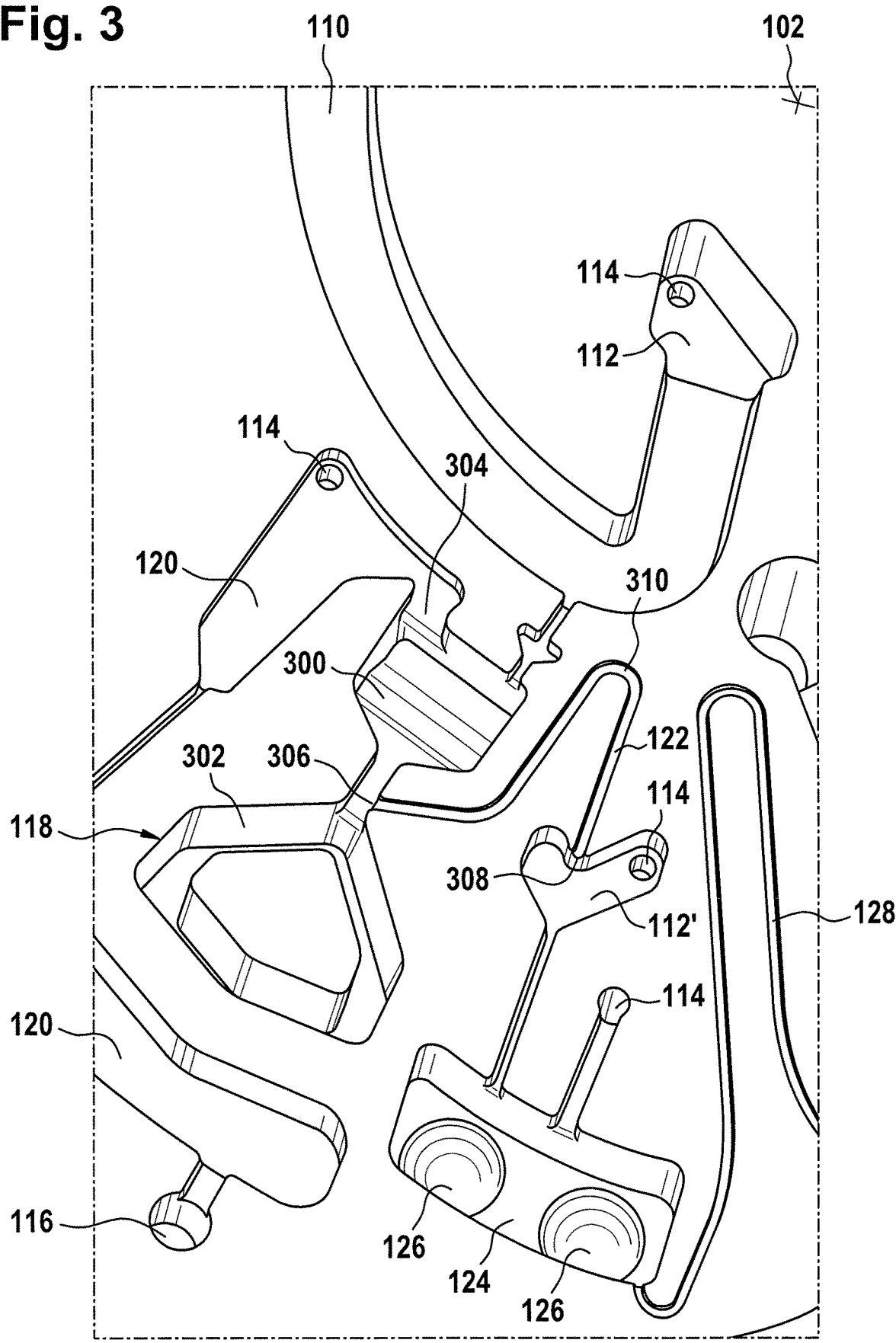
FIG. 3 shows a further view of the cartridge of FIG. 1.

FIG. 3 shows an enlarged region of FIG. 1 which illustrates the blood separation chamber 118 and the processing chamber 124 in greater detail. The separation chamber 118 is shown as containing an upper portion 300 and a lower portion 302. The upper portion 300 is closer to the rotational axis 102. The overflow chamber is shown as having an overflow opening 304. The overflow opening 304 sets the maximum volume of fluid within the blood separation chamber 118. In this example the first valve structure 122 is a siphon. It may also be referred to as a first siphon. The first siphon 122 has a siphon entrance 306 in the blood separation chamber 118. The first siphon 122 also has a siphon exit 308 into the expansion chamber 112'. In this example there is an additional expansion chamber 112' located between the blood separation chamber 118 and the processing chamber 124. In other examples the siphon exit 308 may be directly connected to the processing chamber 124.

The expansion chamber 112 enables the processing chamber 124 to be located further from the rotational axis. This may in some instances provide additional space for the processing chamber 124. In examining FIG. 3 it can be seen that the siphon exit 308 is closer to the rotational axis 102 than the siphon entrance 306. This is done because it traps an additional amount of blood plasma within the upper portion 300. The last bit or amount of blood plasma may contain fatty or oily tissues which are contained in the blood plasma. Placing the siphon exit 308 closer to the rotational axis 102 may reduce the amount of this material in the blood plasma which is ultimately transferred to the processing chamber 124. This may result in a superior or more accurate measurement of the analyte.

It can be seen that the first siphon 122 has a nearest location 310 to the rotational axis 102. Between the nearest location 310 and the siphon exit 308 the distance to the rotational axis 102 increases monotonically.

Figure 4:
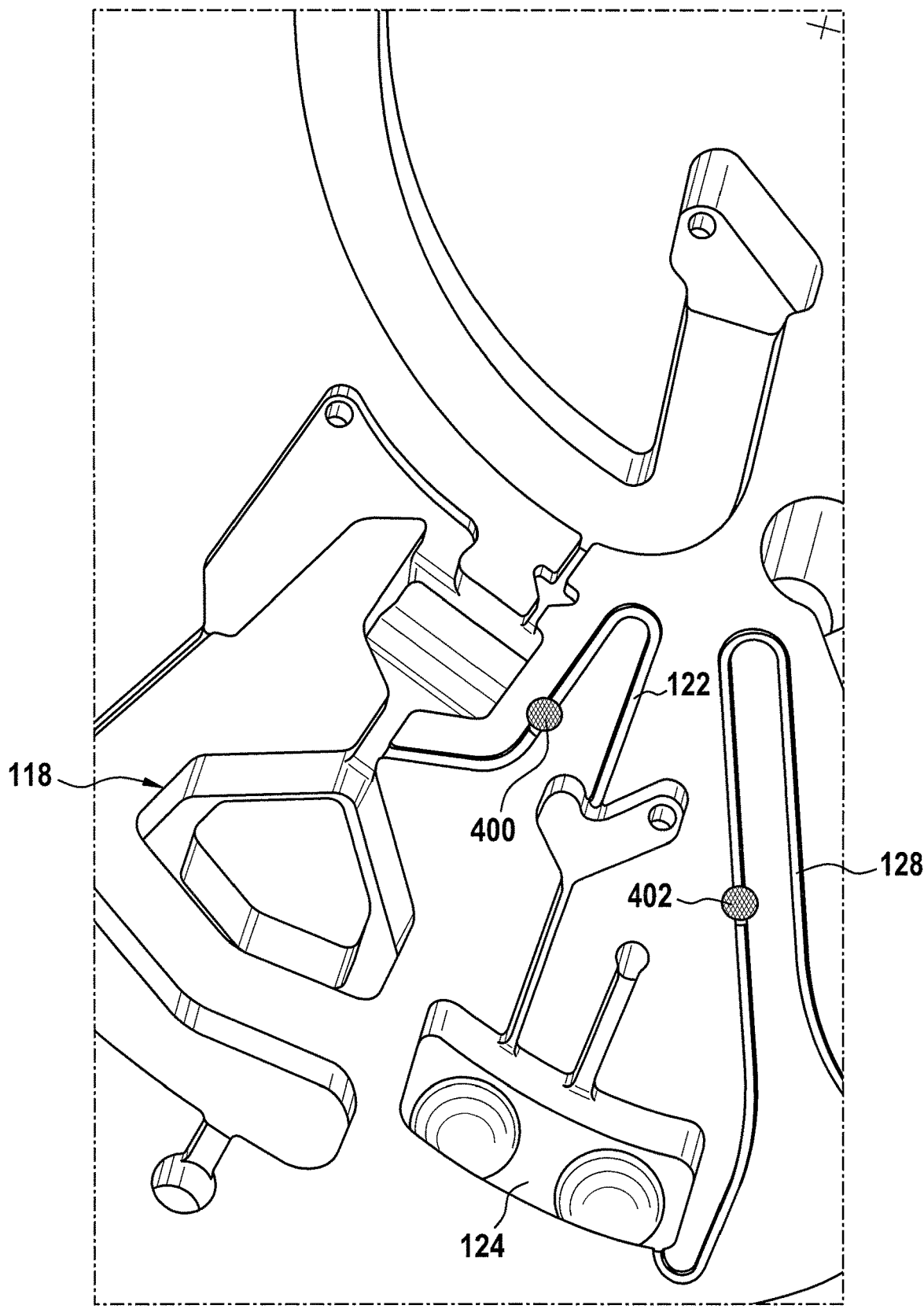
FIG. 4 shows an alternative to the components illustrated in FIG. 3.

FIG. 4 shows a further enlarged region of the cartridge 100. The region of FIG. 4 is identical to that of FIG. 3. In the example shown in FIG. 4 the first valve structure 122 and the second valve structure 128 have been modified. The first valve structure 122 comprises a valve element 400 and the second valve structure 128 comprises a valve element 402. The valve element 400 and 402 may be mechanical valves which may be opened and/or closed through a variety of means. For example the valve elements 400, 402 could be mechanically actuated, they could comprise a wax or other material which is melted by heat, as well as they could be magnetically operated, or actuated using other means.

Figure 5:
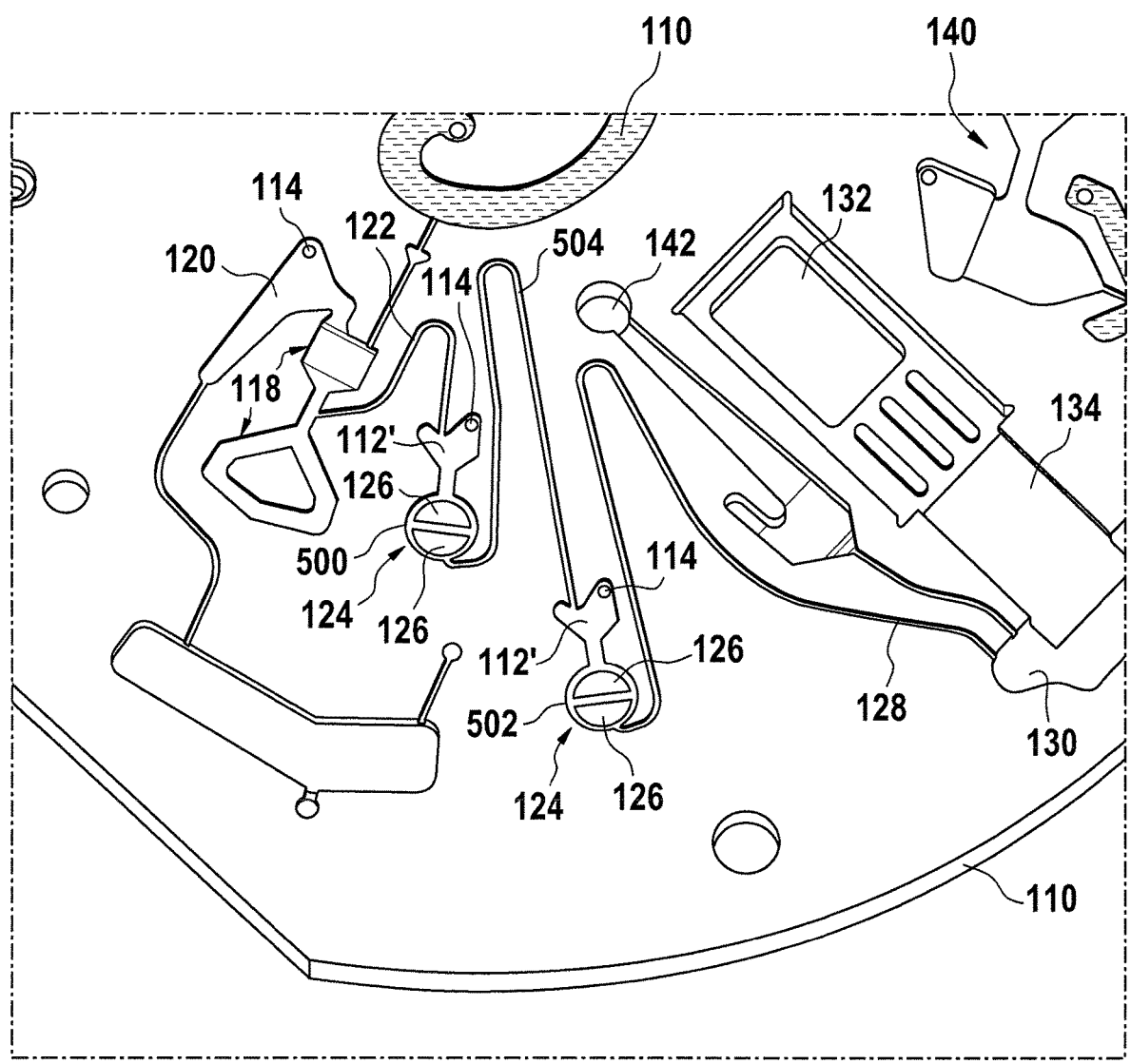
FIG. 5 shows an alternative to the processing chamber of the illustrated in FIG. 1.

FIG. 5 shows a modification of the cartridge 100 shown in FIG. 1. In the example shown in FIG. 5 the processing chamber 124 has been broken into two separate sub-chambers 500 and 502. The first valve structure 122 is connected to the first sub-chamber 500. There is then an intermediate valve structure 504 between the first sub-chamber 500 and the second sub-chamber 502. The second valve structure 128 is then connected from the second sub-chamber 502 to the measurement structure 130. The two sub-chambers 500, 502 can be used to process the blood plasma sequentially with different reagents.

Figure 6:
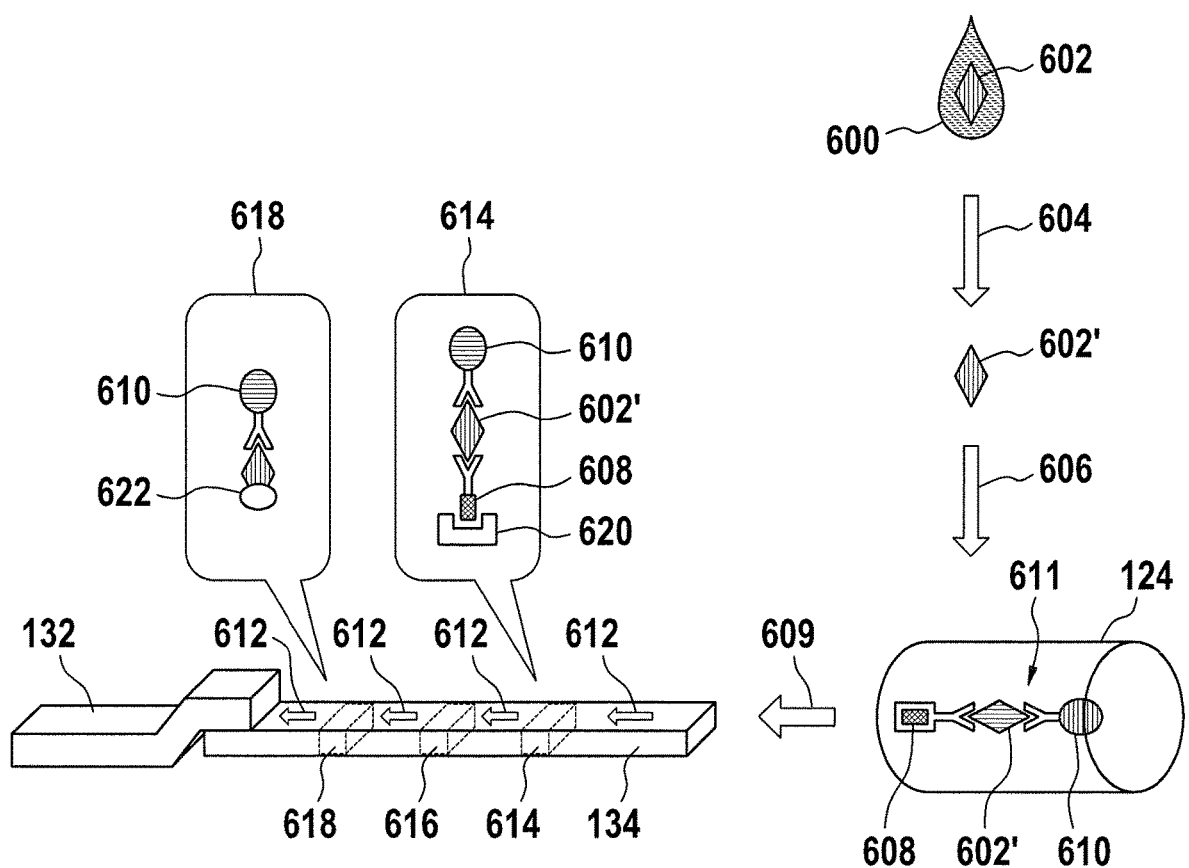
FIG. 6 shows a symbolic diagram which illustrates the principle of how the quantitative analyte can be determined using the cartridge.

FIG. 6 shows a symbolic diagram which illustrates the principle of how the quantitative analyte is determined using the cartridge. 600 represents a blood sample and 602 the analyte present in the blood 600. The arrow 604 represents the generation of plasma by centrifugation. 602' represents the analyte 602 in plasma. The arrow 606 represents the mixing of plasma with a dried assay reagent and incubation in the processing chamber. Reference symbol 124 represents the processing chamber. In the processing chamber a capture antibody 608 and a detection antibody 610 attach to the analyte 602' in the plasma. The combination of the capture antibody 608 and the detection antibody 610 with the analyte 602' forms an analyte specific binding partner complex 611. Arrow 609 represents the transport to the measurement structure.

The arrows 612 represent the plasma transport through the chromatographic membrane 134 of the measurement structure. The three bars 614, 616 and 618 represent three different zones on the chromatographic membrane 134. Reference symbol 614 represents a capture and detection zone. Bar 616 represents an instrument control zone. Bar 618 represents an assay control zone. In the capture and detection zone 614 there may be a capture element 620 that bonds to the capture antibody 608. For example the capture element could be streptavidin and the capture antibody could be biotinylated. When the capture antibody 608 comes in contact with the capture element 620 it bonds fast to the capture antibody 608 and thereby to the complete analyte specific binding partner complex 611. The detection antibody 610 which is part of this bound analyte specific binding partner complex 611 is thereby also immobilized at this location and can then be detected later. For example the detection antibody 610 contains a fluorescent label such as fluorescent-latex. The instrument control zone 616 may contain also a latex with the fluorescent marker. This can be used to check if the optical measurement system of the instrument is functioning properly and/or to calibrate this optical measurement system. In the assay control zone 618, excess detection antibody 610 bonds to an artificial analyte line 622. The regions 616 and 618 are used as a control to ensure that the cartridge 100 and the optical measurement system of the instrument are functioning properly.

The scheme explained in FIG. 6 when used with the cartridge of FIG. 1 may in some instance provide better measurement results than when using standard laboratory methods. For example the concentration of cardiac troponin was tested using equivalent microfluidic structures in a disc. The results of these tests indicate that the accuracy and reproducibility of the measurements is superior to that obtained in a typical analytical laboratory.

In an embodiment, antibodies which can be used for the detection of human cardiac troponin T are antibodies recognizing the linear epitope ELVSLKD of human cardiac Troponin (P45379, UniProt database) which is located at the amino acid positions 129-135 of P45379 (UniProt database) or recognizing the linear epitope QQRIRNEREKE of human cardiac Troponin (P45379, UniProt database) which is located at the amino acid positions 147-157 of P45379 (UniProt database) or recognizing the linear epitope QQRIRNERE of human cardiac Troponin (P45379, UniProt database) which is located at the amino acid positions 147-155 of P45379 (UniProt database). In an embodiment, these antibodies are monoclonal mouse antibodies. In an embodiment, a combination of a first antibody recognizing the linear epitope ELVSLKD of human cardiac Troponin (P45379, UniProt database) which is located at the amino acid positions 129-135 of P45379 (UniProt database) and a second antibody recognizing either the linear epitope QQRIRNEREKE of human cardiac Troponin (P45379, UniProt database) which is located at the amino acid positions 147-157 of P45379 (UniProt database) or the linear epitope QQRIRNERE of human cardiac Troponin (P45379, UniProt database) which is located at the amino acid positions 147-155 of P45379 (UniProt database) is used to detect human cardiac Troponin T in a sandwich assay format. In another embodiment a combination of a labelled detection antibody recognizing the linear epitope ELVSLKD of human cardiac Troponin (P45379, UniProt database) which is located at the amino acid positions 129-135 of P45379 (UniProt database) and a capture antibody recognizing either the linear epitope QQRIRNEREKE of human cardiac Troponin (P45379, UniProt database) which is located at the amino acid positions 147-157 of P45379 (UniProt database) or the linear epitope QQRIRNERE of human cardiac Troponin (P45379, UniProt database) which is located at the amino acid positions 147-155 of P45379 (UniProt database) is used to detect human cardiac Troponin T in an sandwich assay format. In another embodiment, the label of the labelled detection antibody is a fluorescent latex particle.

Figure 7:
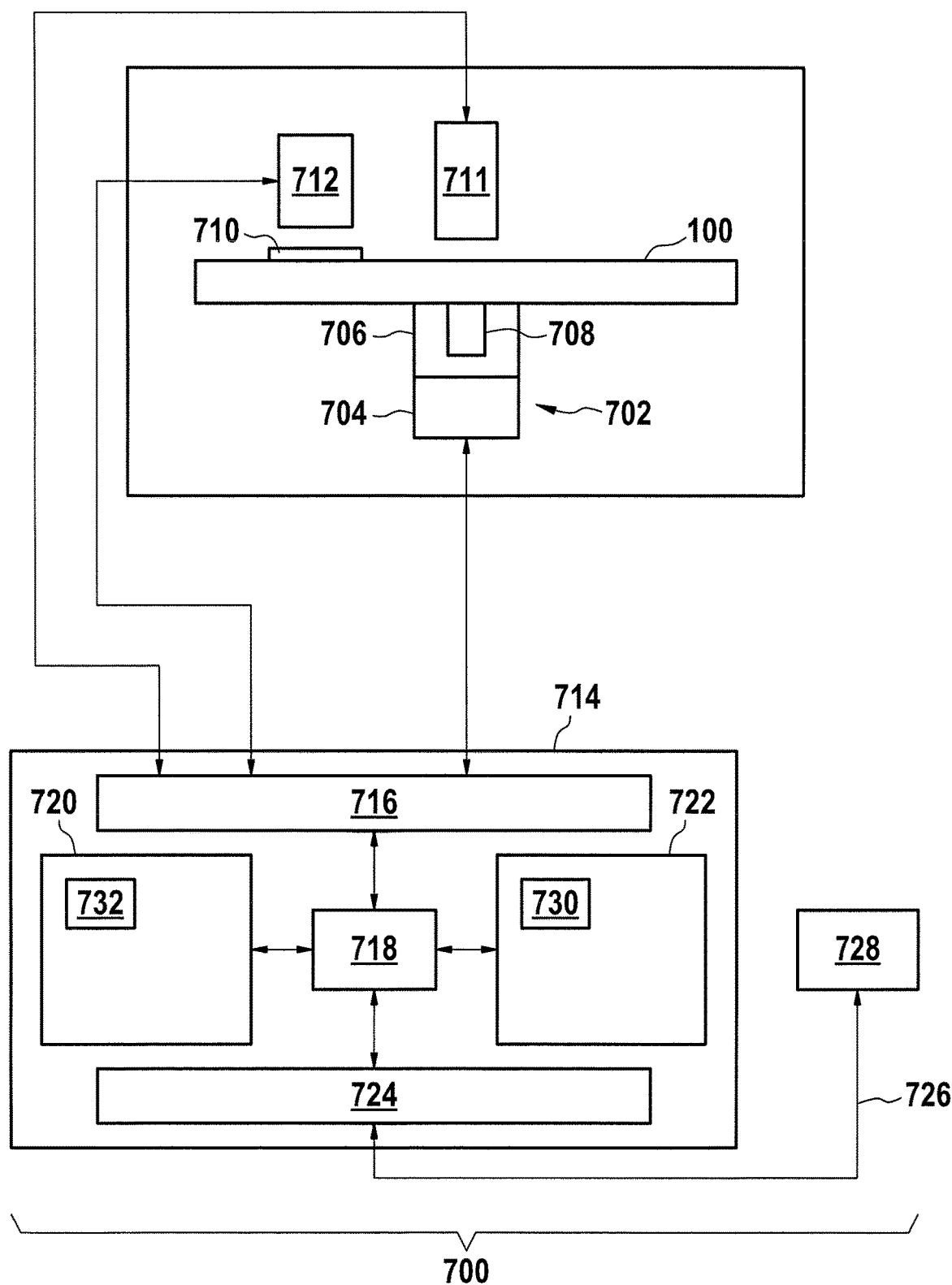
FIG. 7 illustrates an example of an automatic analyzer.

FIG. 7 shows an example of a medical system 700. The medical system 700 is adapted for receiving a cartridge 100. There is a cartridge spinner 702 which is operable for rotating the cartridge 100 about the rotational axis. The cartridge spinner 702 has a motor 704 attached to a gripper 706 which attaches to a portion of the cartridge 708. The cartridge 100 is shown further as having a measurement or transparent structure 710. The cartridge 100 can be rotated such that the measurement structure 710 goes in front of an optical measurement system 712 which can perform for example an optical measurement of the quantity of the analyte. An actuator 711 is also shown in this figure. It can be used to open fluid reservoirs in the cartridge 100. There may also be additional actuators or mechanisms for actuating mechanical valves or valve elements on the cartridge if they are present.

The actuator 711, the cartridge spinner 702, and the measurement system 712 are shown as all being connected to a hardware interface 716 of a controller 714. The controller 714 contains a processor 718 in communication with the hardware interface 716, electronic storage 720, electronic memory 722, and a network interface 724. The electronic memory 730 has machine executable instructions which enable the processor 718 to control the operation and function of the medical system 700. The electronic storage 720 is shown as containing a measurement 732 that was acquired when instructions 730 were executed by the processor 718. The network interface 724 enables the processor 718 to send the measurement 732 via network connection 726 to a laboratory information system 728.

Figure 8:
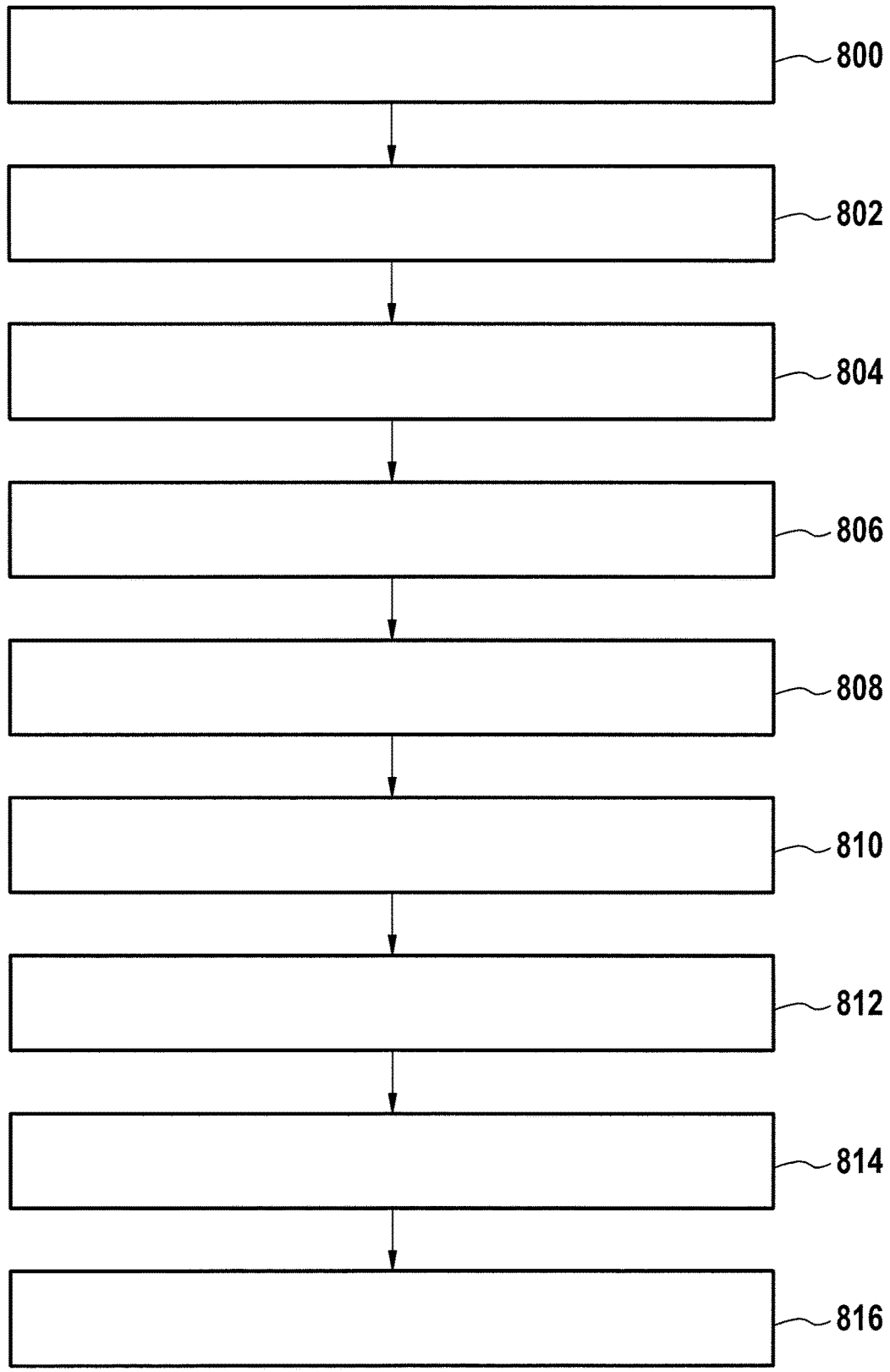
FIG. 8 shows a flow chart which illustrates a method of operating the automatic analyzer of FIG. 7.

FIG. 8 shows a flowchart, which illustrates a method of operating the medical system 700 of FIG. 7. The steps in FIG. 8 for example may be machine-executable instructions that are included in the instructions 730. Before the method of FIG. 8 is performed a blood sample for example may be placed into the inlet and then the cartridge 100 is placed into the medical system 700. First in step 800 the processor 718 controls the motor 704 such that the cartridge is rotated about the rotational axis to transport the blood sample into the blood separation chamber. Next in step 802 the processor 718 further controls the motor 704 such that the rotation of the cartridge about the rotational axis separates the blood plasma from the corpuscular blood sample components by centrifugation. Next in step 804 the processor 718 controls the motor 704 such that the first valve structure is opened and the cartridge is rotated about the rotational axis at a sufficient velocity to transport a defined portion of the blood plasma from the blood separation chamber to the processing chamber. In the case where the valve structures comprise mechanical valve elements there may be an additional mechanism or apparatus that the processor controls 718 to open these mechanical valve elements.

Next in step 806 the processor 718 controls the rotation rate of the motor 704 such that the portion of the blood plasma is held in the processing chamber. During this time the blood plasma mixes with the reagent and combines with at least one specific binding partner to form the at least one analyte-specific binding partner complex. Next in step 808 a seal is released to enable a first part of the washing buffer to enter the measurement structure by the processor 718. For example the processor 718 may control the actuator 711 to compress the fluid chamber 136 shown in FIG. 2. Next in step 810 the processor 718 controls the rotation rate of the motor 704 such that the second valve structure is opened to transfer the at least one specific binding partner complex to the measurement structure and such that the cartridge allows the at least one analyte-specific binding partner complex to flow to the measurement structure through the second valve structure. Again if the second valve structure comprises a mechanical valve element then the processor may also control an additional apparatus or mechanism to open this mechanical valve element.

Next in step 812, the processor 718 controls the rotational rate of the motor 704 such that the cartridge allows the at least one analyte-specific binding partner complex to flow across the membrane to the absorbent structure at a defined velocity and to allow the at least one analyte-specific binding partner complex to bind to the immobilized binding partner. In step 814 the processor 718 controls the rotational rate of the motor 704 such that the cartridge spins at a rate that allows the first part of the washing buffer to flow across the membrane to the absorbent structure at a defined velocity. In alternate embodiments the step 808 (releasing the seal to enable a first part of the washing buffer to enter the measurement structure) is performed directly before step 814. Finally in step 816 the processor 718 controls the optical measurement system 712 to perform the measurement using the optical measurement system. This measurement 732 may then be transformed into an analyte quantity or concentration.

Figure 9A:
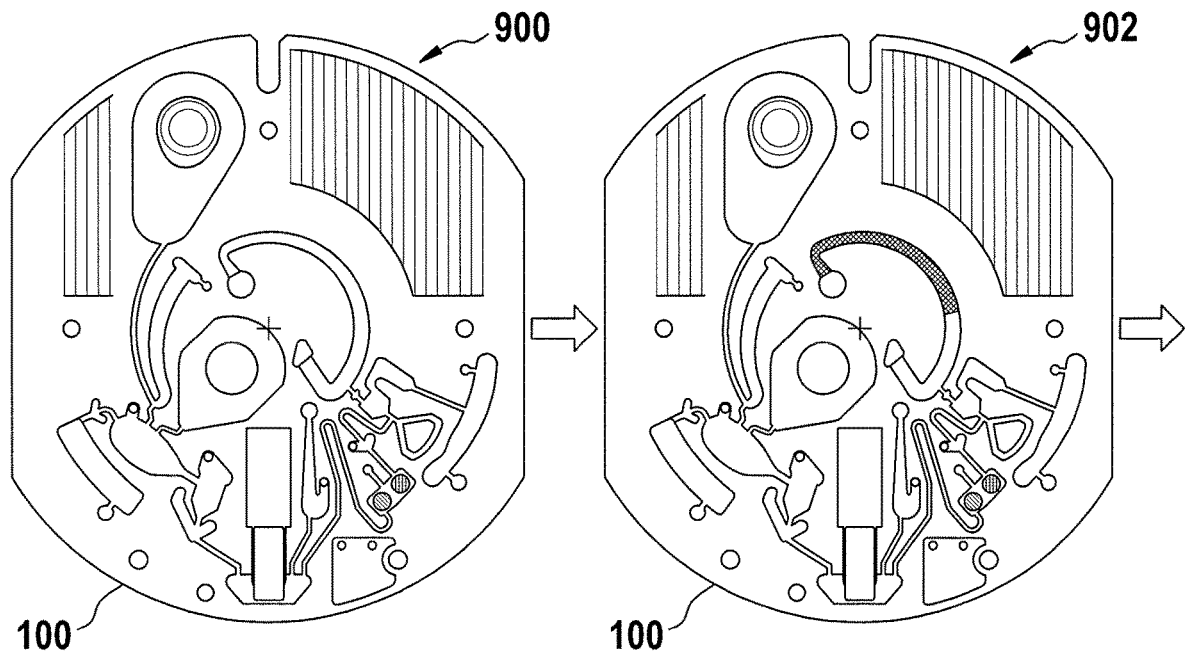
FIGS. 9a, 9b and 9c illustrate graphically a method determining a quantity of analyte in a blood sample using the cartridge of FIG. 1.
Figure 9A:
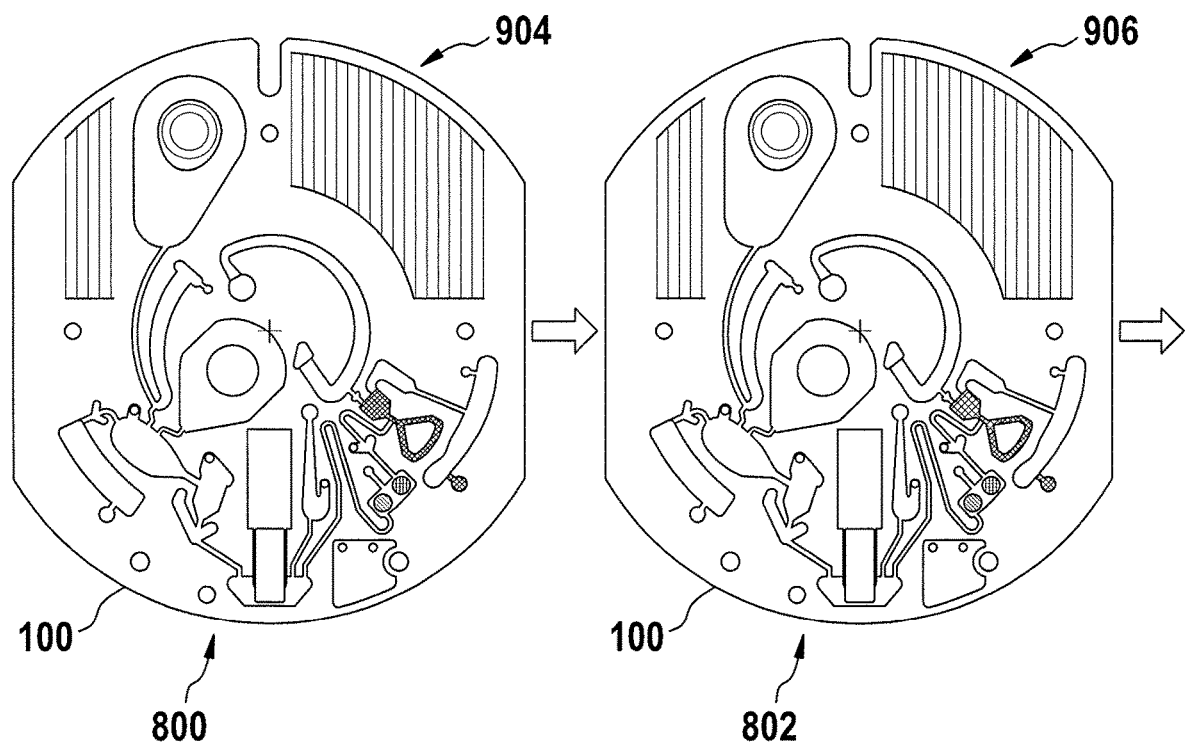
Figure 9B:
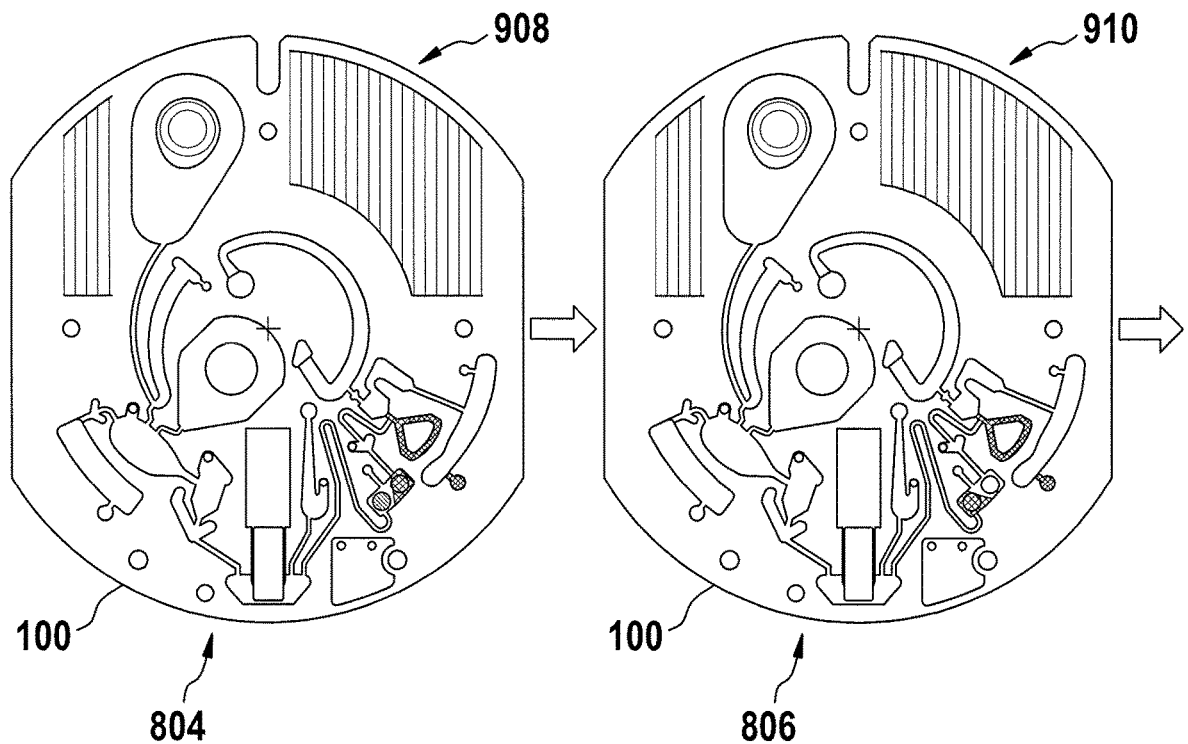
Figure 9B:
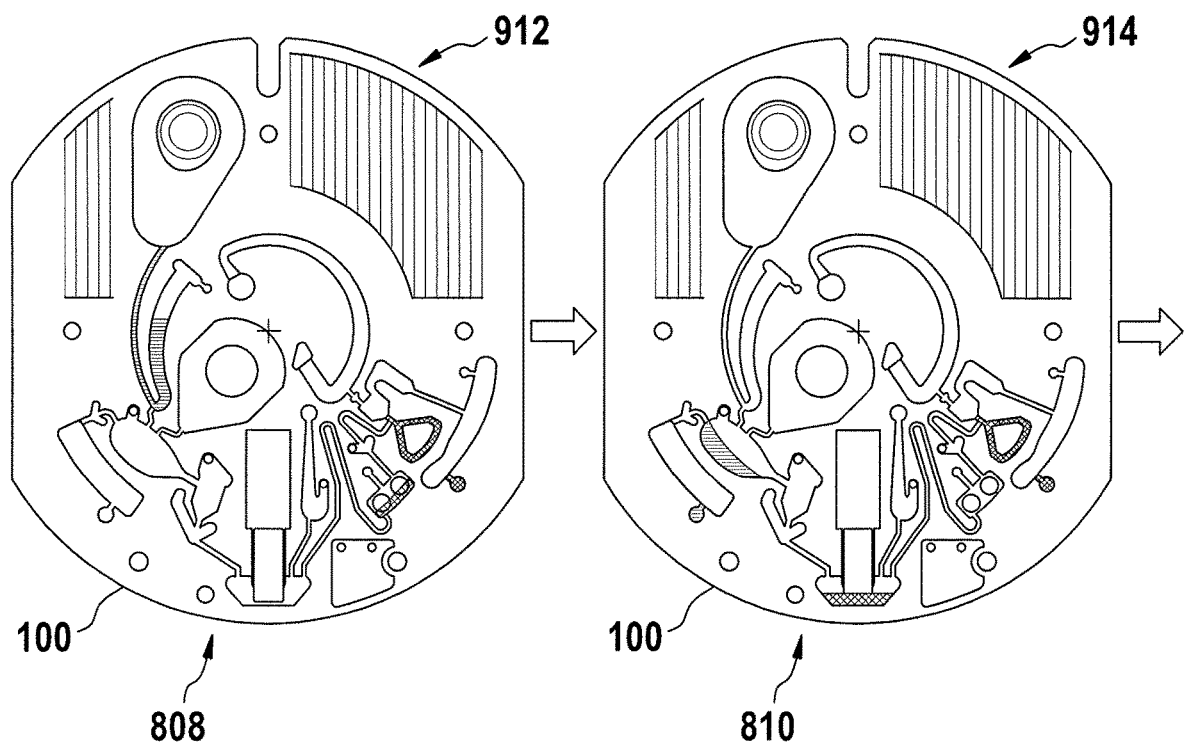
Figure 9C:
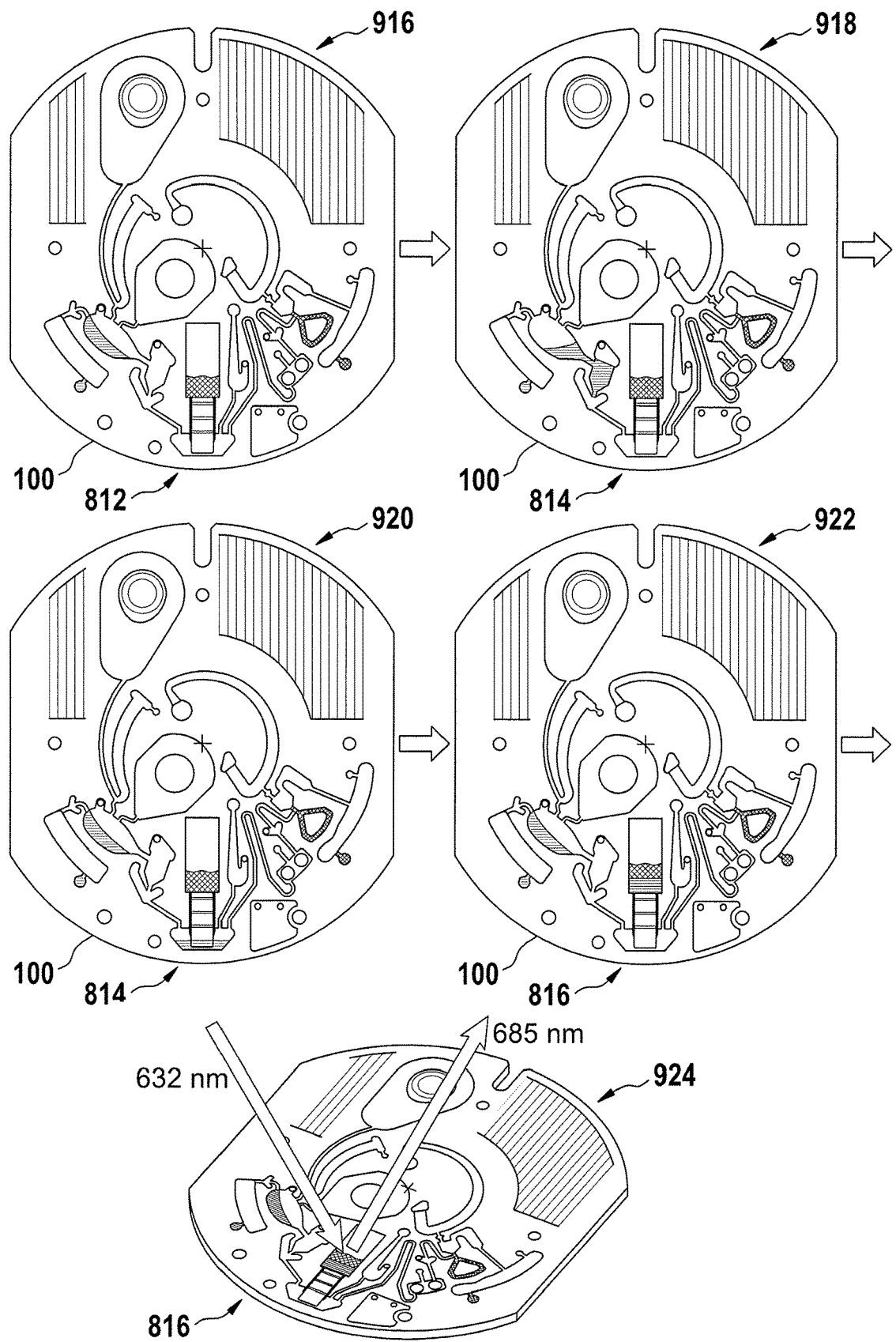

FIGS. 9A, 9B and 9C illustrate graphically a method determining a quantity of analyte in a blood sample using the cartridge 100. The method is illustrated graphically in FIGS. 9A, 9B and 9C. Image 900 shows the cartridge 100 in its initial condition. Next in step 902 blood is placed into the inlet. Next in step 904 the blood sample is transferred to the blood separation chamber. In step 906 the plasma is separated from the red blood cells by centrifugation. Next in step 908 the blood plasma is transferred to the processing chamber. Next in step 910 the blood plasma is mixed with the reagent. In step 912 the washing buffer is released by breaking the seal. In step 914 the incubate or the combination of the blood plasma and the reagent is transferred to the measurement structure.

Next in step 916 the chromatography of the analyte-specific binding partner complex or incubate is performed. Next in step 918 the washing buffer is metered. In several instances the structure depicted may be used to provide multiple meterings of the washing buffer. However, this is not necessary in all cases and it is possible that only the fluid from the fluid chamber is transferred and that there is no metering step. Next in step 920 the washing buffer is transferred to the measurement structure and wicked across the chromatographic membrane 134 into the absorbent structure 132, as shown in step 922. Finally, in step 924 the measurement of the analyte is performed using a fluorescence measurement.

Figure 10:
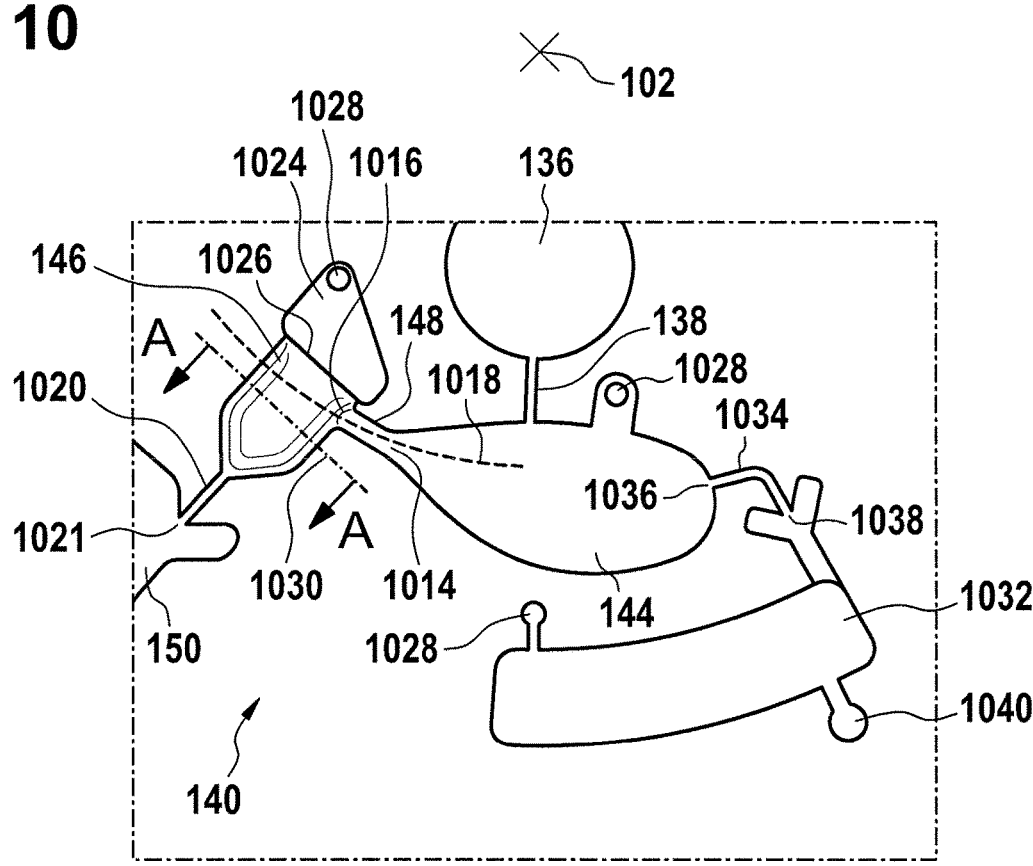
FIG. 10 illustrates a metering structure for performing multiple aliquots of a fluid.

FIG. 10 shows an example of a metering structure 140. The metering structure part of the fluidic components that make up a cartridge 100 as is shown in FIG. 1. There is a rotational axis labeled 102. Also shown in the Fig. is a portion of a fluid chamber 136. The fluid chamber is designed for having a reservoir that provides fluid via a fluid chamber duct 138 that leads into the aliquoting chamber 144. In this example the aliquoting chamber 144 is whale-shaped. There is a connecting duct 148 which connects the aliquoting chamber 144 with a metering chamber 146. The connecting duct 148 has a duct entrance 1014 and a duct exit 1016. The duct entrance 1014 leads to the aliquoting chamber 144 and the duct exit 1016 leads to the metering chamber 146. A circular arc 1018 that is drawn about the rotational axis 102 passes both through the duct entrance 1014 and the duct exit 1016. The metering chamber 146 is connected via a tube-like structure 1020 to a fluidic element 150. In this example there is a valve 1021 between the tube-like structure 1020 and the metering chamber 146. In this example the valve 1021 is a capillary valve.

The valve 1021 could be implemented in different ways. In some alternatives the shape of the interface between the tube-like structure 1020 and the fluidic element 150 could function as a capillary valve. Alternatively a valve could be placed between the elements 1020 and 150. In other embodiments a duct could be connected in the same location and a controllable microvalve could be used instead. The controllable microvalve could be placed between the metering chamber 146 and the tube-like structure 1020 or between the tube-like structure 1020 and the fluidic element 150.

Figure 11:
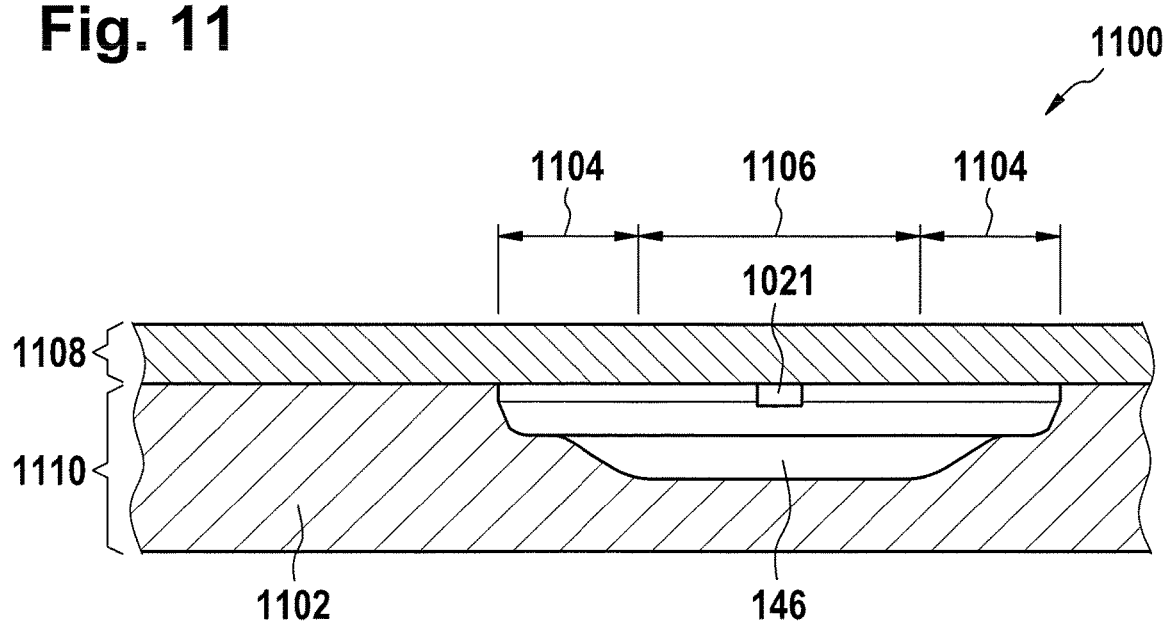
FIG. 11 illustrates a cross sectional view of a metering chamber.

An optional expansion chamber 1024 is shown as bordering on an upper edge 1026 of the metering chamber 146. There is a vent 1028 which vents the expansion chamber 1024. The whole boundary between the metering chamber 146 and the expansion chamber 1024 is open. This may help reduce the chances of bubbles forming in the metering chamber 146. In some examples the expansion chamber 1024 may have a width which is greater than that of the metering chamber 146. Capillary forces may be used then to keep the fluid in the metering chamber 146. The dashed line labeled 1030 and also A-A shows the location of a cross-sectional view of the metering chamber 146. This cross-sectional view is shown in FIG. 11. The aliquoting chamber 144 can be shown as also having a vent 1028. The region around the duct entrance 1014 is in this embodiment funnel-shaped. It may also be noted that the aliquoting chamber 144 is shown as not having sharp edges. The lack of sharp edges helps to facilitate the movement of fluid from the aliquoting chamber 144 to the duct entrance 1014 when the disc is decelerated.

The aliquoting chamber 144 is also shown as having a connection to a fluidic connection 1034 which leads to an excess fluid chamber 1032. The fluidic connection 1034 has a fluidic connection entrance 1036. The fluidic connection entrance 1036 defines the maximum fluid level in the aliquoting chamber 144. The maximum fluid level in the aliquoting chamber 144 is lower than the circular arc 1018. The fluidic connection 1034 is connected to the excess fluid chamber 1032 via a capillary valve 1038 in this embodiment. The use of a valve or a capillary valve is optional. The excess fluid chamber is shown as having a vent 1028 and it is also connected to a fail-safe chamber 1040. When the fluid flows into the excess fluid chamber 1032 the fail safe chamber 1040 is filled. The fail safe chamber 1040 may be used to indicate optically if fluid has entered the excess fluid chamber 1032. For example during use if the fail safe chamber 1040 is not filled it may indicate that the aliquoting chamber 144 was not properly filled with fluid.

FIG. 11 shows a cross-sectional view 100 of the profile A-A which is labeled 1030 in FIG. 10. In this Fig. the body of the cartridge 1102 can be seen. There is an opening in the body 1102 for the metering chamber 146. The body of the cartridge 1102 in this example is fabricated by injection molding. The body of the cartridge is assembled from a lid 1108 and a support structure 1110.

At the far end of the metering chamber the entrance into the valve 1021 can be seen. The metering chamber 146 can be seen as being divided into several different regions. On the edges there are two sidewalls regions 1104. Between the two sidewalls regions or two side regions is a central region 1106. The sidewall 1104 regions become more narrow or taper away from the central region 1106. This causes a narrowing in the dimensions of the metering chamber 146 in this region. The capillary action may therefore be higher in the sidewall regions 1104 than in the central region 1106.

This may cause the metering chamber 146 to fill with fluid first in the sidewall regions 1104 before the central region 1106. This may have the benefit of reducing the number of bubbles which are formed or trapped in the metering chamber 146 when the metering chamber 146 is filled with fluid.

FIGS. 12-18 illustrate how the metering structure 140 may be used to perform multiple aliquotations of fluid to the fluidic elements 150.

Figure 12:
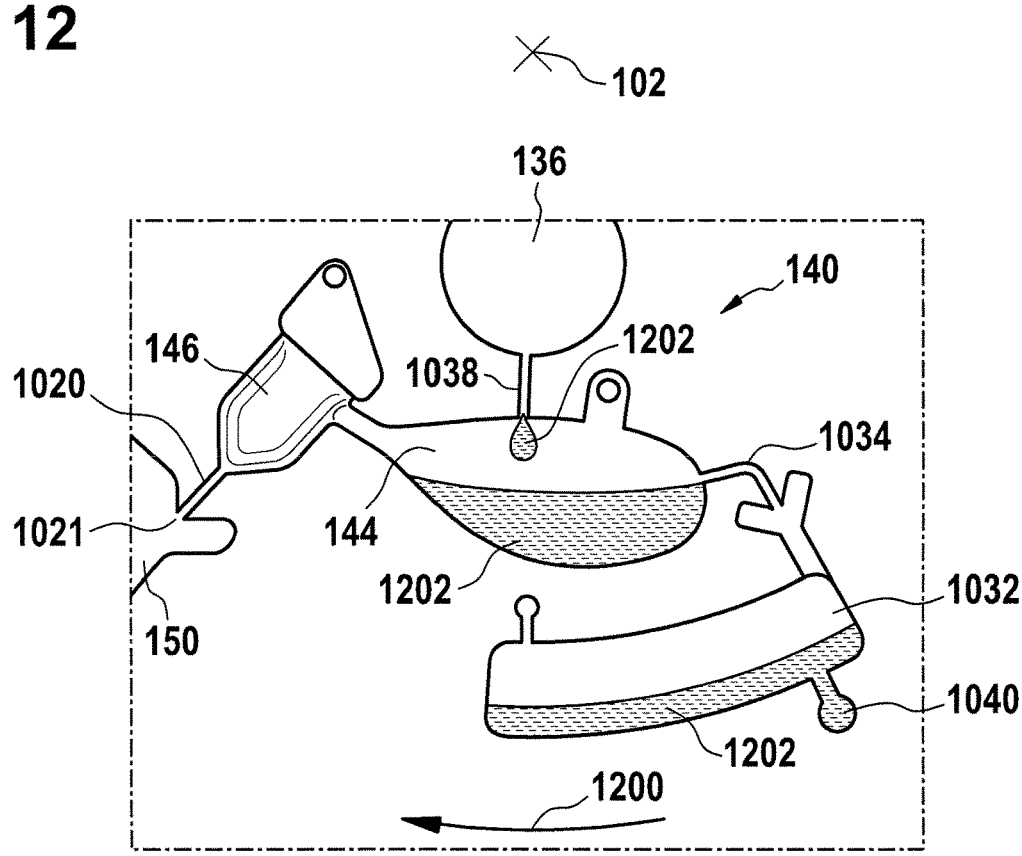
FIG. 12 illustrates part of a method of performing a dispensing fluid using the metering structure of FIG. 10.

In FIG. 12 the disc is rotated about the rotational axis 102. The arrow 1200 indicates the direction of rotation. In this particular example the disc is spinning at 20 Hz. Fluid or washing buffer 1202 is transported into the aliquoting chamber 144 from the fluid chamber 136. Fluid 1202 can be seen dripping from the fluid duct 138 into the aliquoting chamber 144. The fluid volume in the aliquoting chamber 144 is limited and thereby metered by the fluidic connection 1034 which connects to the excess fluid chamber 1032. The fail safe chamber 1040 can be seen as being filled with fluid.

Figure 13:
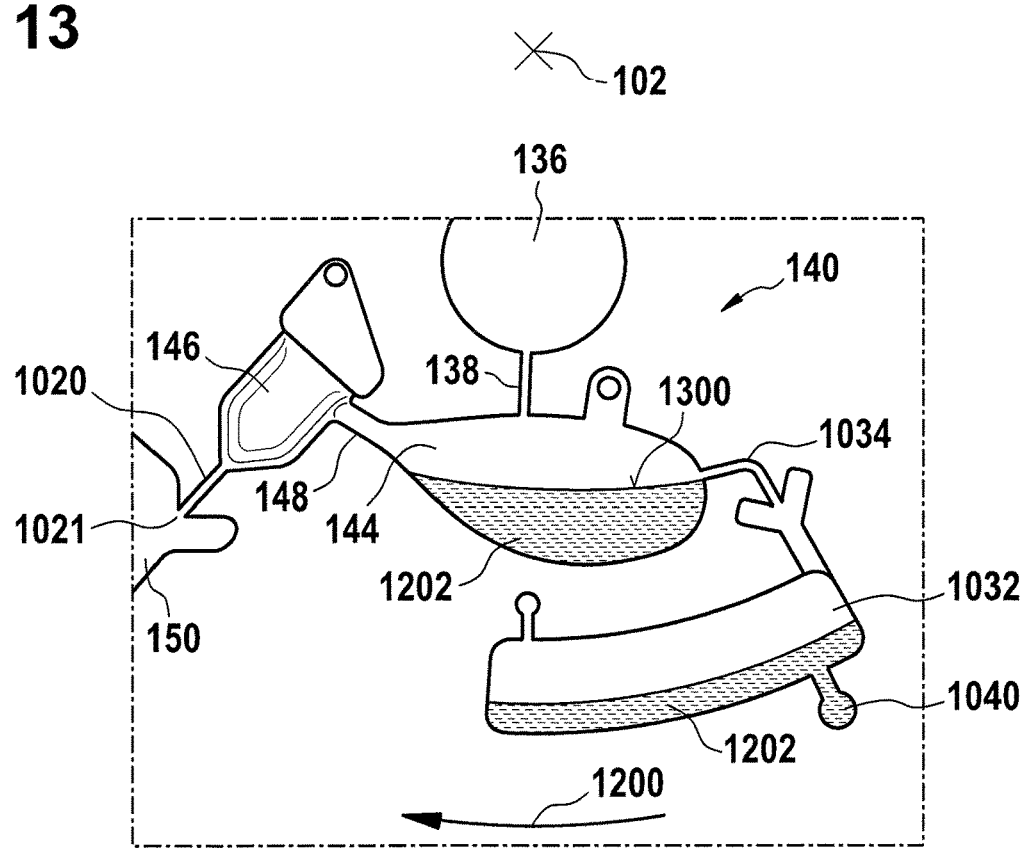
FIG. 13 further illustrates part of a method of performing a dispensing fluid using the metering structure of FIG. 10.

Next in FIG. 13 the fluid volume 1202 has been completely transferred from the fluid chamber 136 into the aliquoting chamber 144. The fail safe chamber 1040 is shown as being filled with the fluid. In this example the disc is still spinning at the same rate as was shown in FIG. 12. The aliquoting chamber 144 is filled with fluid 1202 up to the maximum fluid level 1300. It can be seen that the maximum fluid level 1300 is below or further away from the rotational axis 102 than the connecting duct 148. When the disc is spinning in this way the fluid 1202 cannot enter the metering chamber 146.

Figure 14:
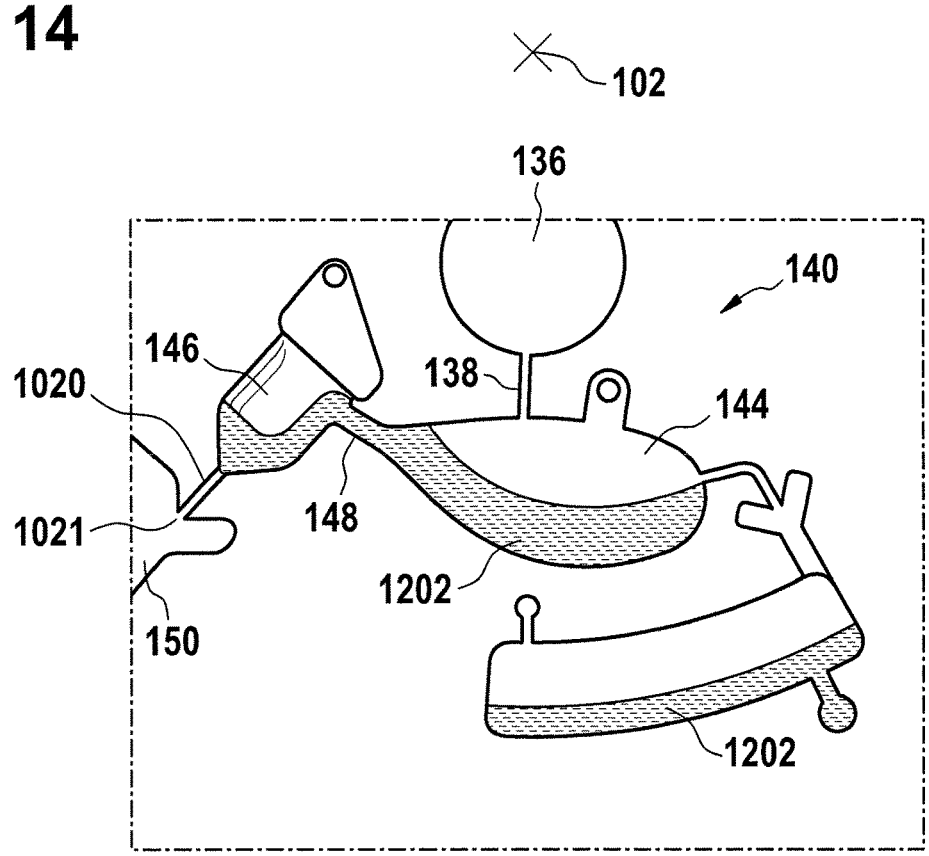
FIG. 14 further illustrates part of a method of performing a dispensing fluid using the metering structure of FIG. 10.

Next in FIG. 14 the disc stops or is decelerated to a lower rotational frequency with a high rate of deceleration for example at 50 Hz per second. The inertia of the fluid forces the fluid 1202 towards and through the connecting duct 148 and into the metering chamber 146. It can be seen in this Fig. that the fluid 1202 is filling the sides of the metering chamber 146 before it is filling the central region. This is because of the tapered side walls 1104 shown in FIG. 11. Capillary action causes this side wall portion of the metering chamber 146 to fill first. This manner of filling the metering chamber may reduce the chances that air bubbles form or adhere in the metering chamber 146.

Figure 15:
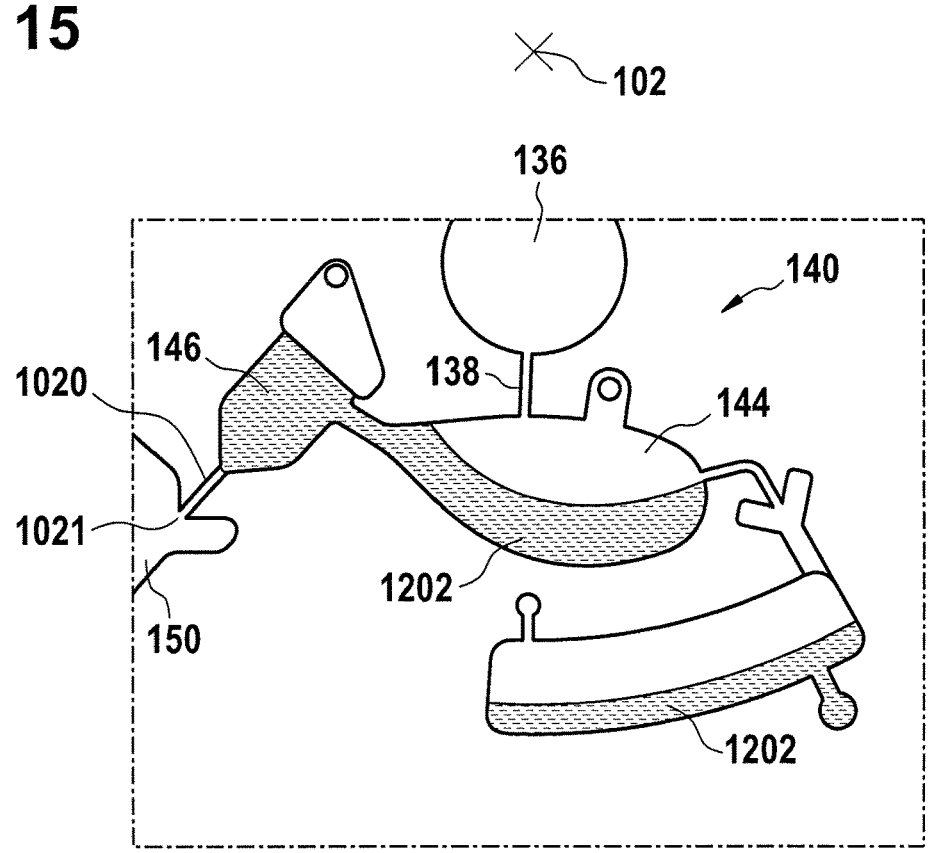
FIG. 15 further illustrates part of a method of performing a dispensing fluid using the metering structure of FIG. 10.

In FIG. 15 the cartridge is still stationary or at a reduced rotation rate and the metering chamber 146 is completely filled with fluid 1202. The cartridge or disc may still be considered to be at rest. The complete filling of the metering chamber is caused by capillary forces caused by the respective geometrical dimensions of the metering chamber.

Figure 16:
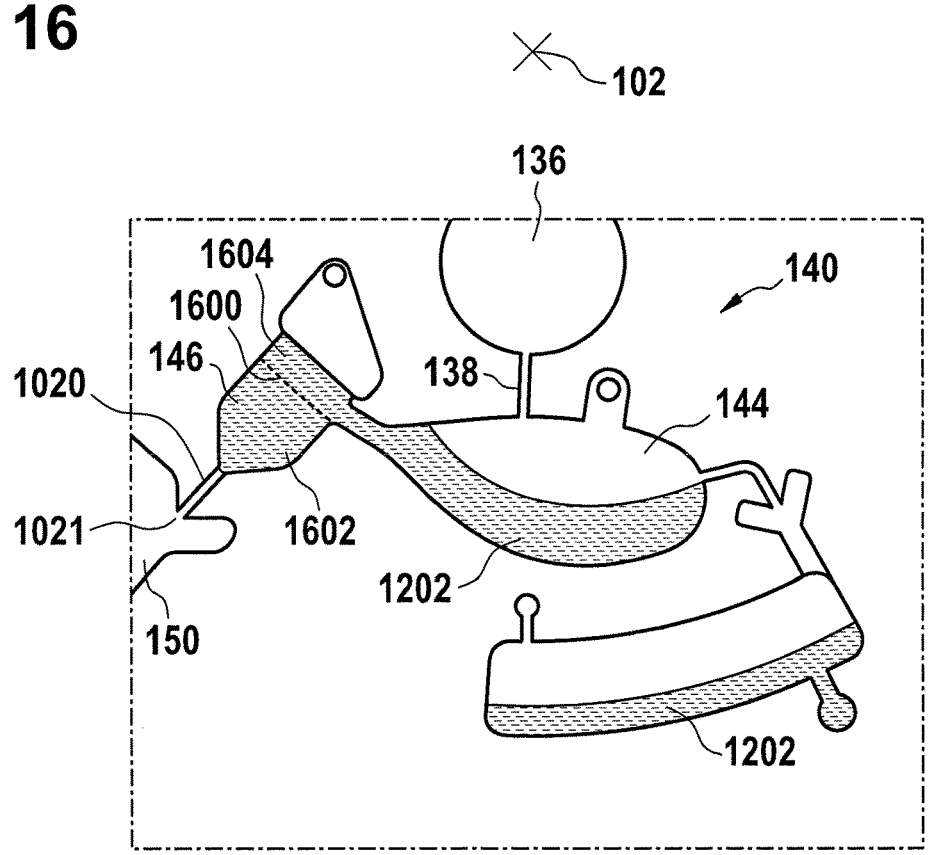
FIG. 16 further illustrates part of a method of performing a dispensing fluid using the metering structure of FIG. 10.

FIG. 16 shows the same view as is shown in FIG. 15 except a dashed line 1600 has been drawn in the metering chamber 146. This line 1600 in the metering chamber 146 divides the fluid in the metering chamber into several parts or portions. The fluid part 1604 radially inwards (closer to rotational axis 102) from the line 1600 may flow back into the reservoir. The radially outward part (further away from the rotational axis 102) or part 1602 may be completely transferred into the fluidic elements 150. The radially inward part 1604 can be referred to as the remaining part of the fluid and the radially outward part 1602 can be referred to as the part of the fluid 1602 that is transferred into the downstream fluidic element. The volume of the fluid 1602 is the aliquot transferred in a subsequent step to the fluidic elements 150.

Figure 17:
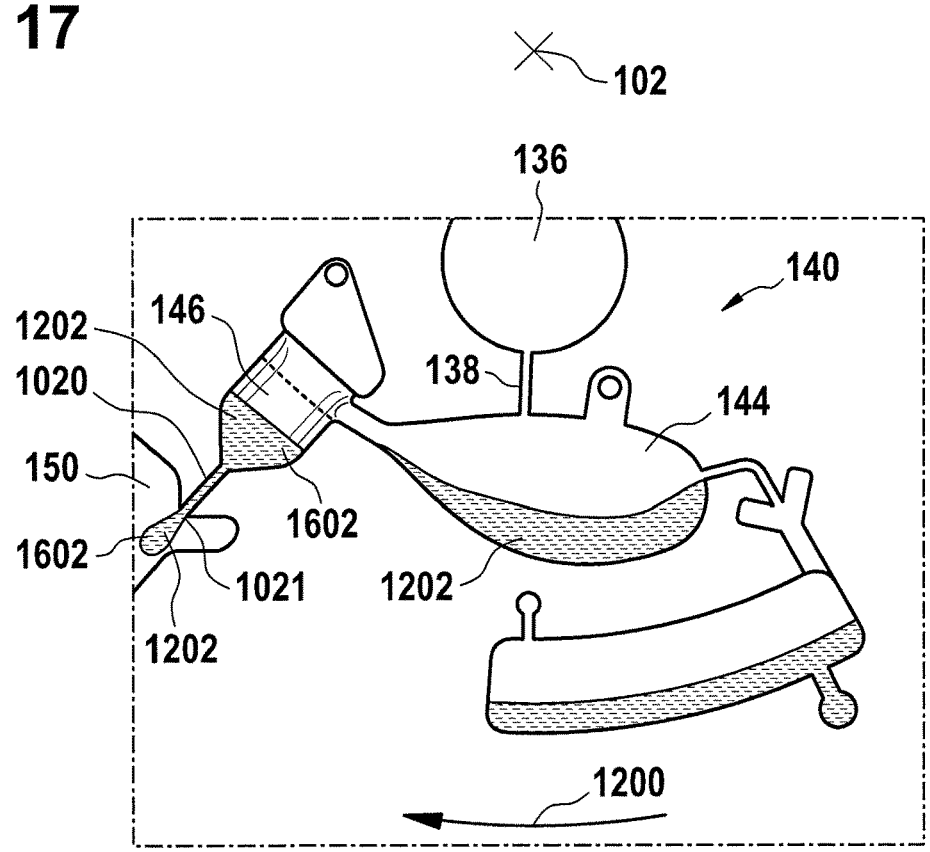
FIG. 17 further illustrates part of a method of performing a dispensing fluid using the metering structure of FIG. 10.

Next in FIG. 17 the disc begins to accelerate and spin around in the direction 1200. The disc accelerates; this causes the capillary valve 1021 to open. The remaining part of the fluid 1604 was transferred back to the aliquoting chamber 144. The part of the fluid 1602 is in the process of being transferred to the fluidic elements 150. A drop of the fluid can be seen dropping from the tube 1020.

Figure 18:
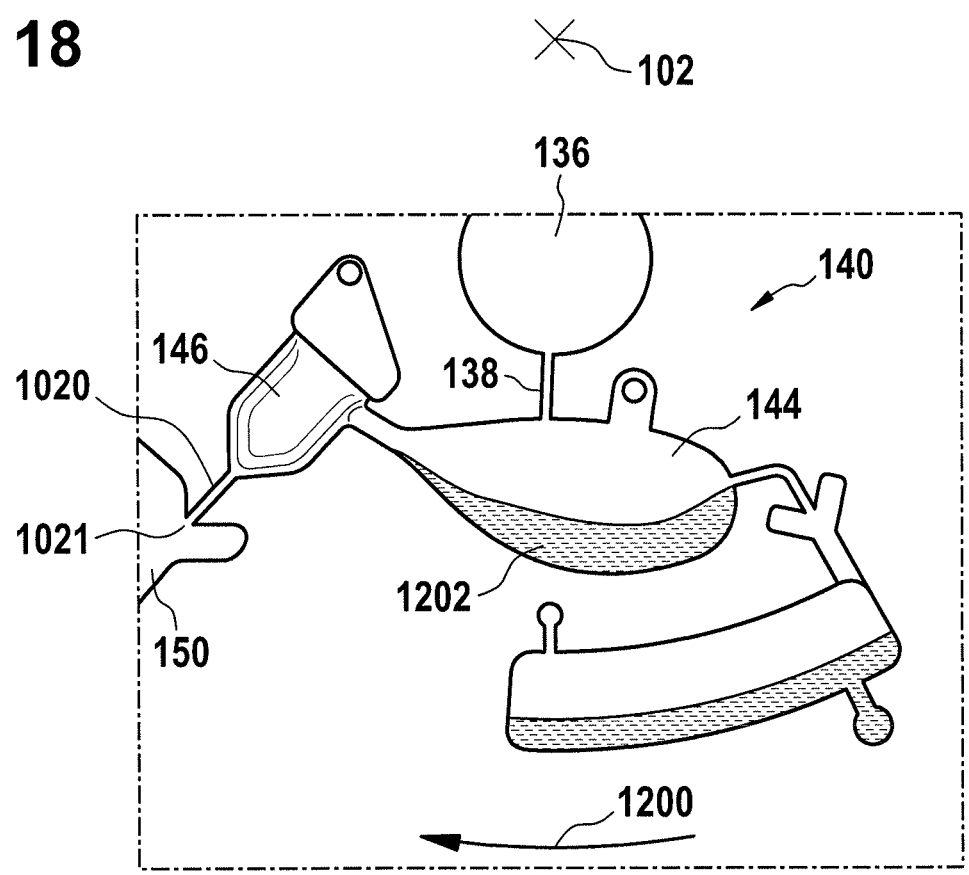
FIG. 18 further illustrates part of a method of performing a dispensing fluid using the metering structure of FIG. 10.

Next in FIG. 18 it can be seen that the fluid volume 1602 has been completely transferred to the fluidic elements 150 and is no longer visible in the Fig. The remaining part of the fluid 1604 has been transferred back into the aliquoting chamber 144 and is mixed with the remaining fluid 1202. The first aliquotation step is finished; the process may be repeated again from FIG. 14 and may be repeated until the fluid volume 1202 in the aliquoting chamber 144 is smaller than the volume of the metering chamber 146.

Figure 19:
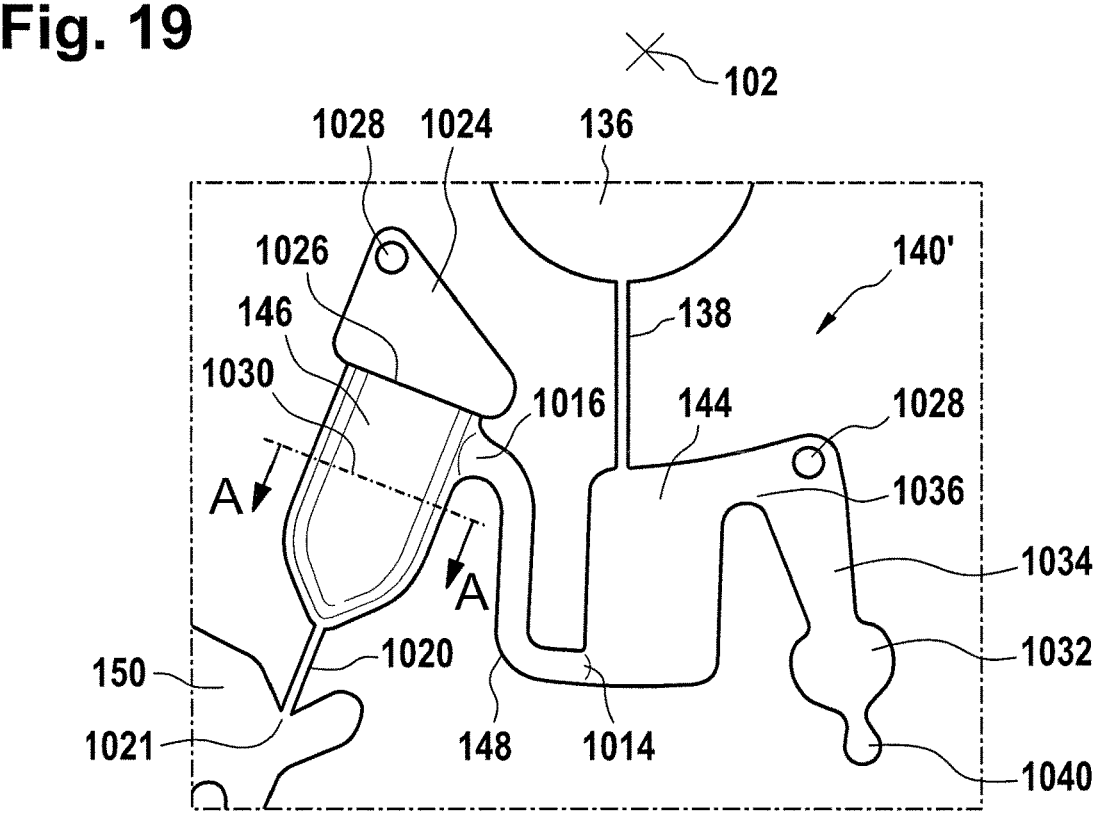
FIG. 19 illustrates an alternative metering structure for performing multiple aliquots of a fluid.

FIG. 19 shows an example of an alternate metering structure 140'. The metering structure 140' may replace the metering structure 140 in FIG. 1. The mechanical structure of the metering structure 140' is similar to the metering structure 140 of FIG. 10 with several mechanical differences. Again, there is a rotational axis labeled 102. Also shown in the Fig. is a portion of a fluid chamber 136. The fluid chamber 136 has a reservoir that provides fluid via a fluid chamber duct 138 that leads into the aliquoting chamber 144. In this example the aliquoting chamber 144 is teapot-shaped. There is a connecting duct 148 which connects the aliquoting chamber 144 with a metering chamber 146. The connecting duct 148 has a duct entrance 1014 and a duct exit 1016. The duct entrance 1014 leads to the aliquoting chamber 144 and the duct exit 1016 leads to the metering chamber 146. The duct entrance 1014 is further away from the rotational axis 102 than the duct exit 1016 of the connecting duct 148 is.

The metering chamber 146 is connected via a tube-like structure 1020 to fluidic element 150. In this example there is a valve 1021 between the tube-like structure 1020 and the fluidic elements. The valve 1021 in this example is a capillary valve. The valve 1021 could be implemented in different ways. In some embodiments the tube-like structure 1020 could functions as the capillary valve. In some embodiments a duct could be connected in the same location and a controllable microvalve could be used instead. The controllable microvalve could be placed between the metering chamber 146 and the tube-like structure 1020 or between the tube-like structure 1020 and the fluidic elements 150.

An expansion chamber 1024 is shown as bordering on an upper edge 1026 of the metering chamber 146. There is a vent 1028 which vents the expansion chamber 1024. The whole boundary between the metering chamber 146 and the expansion chamber 1024 is open. This may help reduce the chances of bubbles forming in the metering chamber 146. In some examples the expansion chamber 1024 may have a width which is greater than that of the metering chamber 146. Capillary forces may be used then to keep the fluid in the metering chamber 146. The dashed line labeled 1030 and also A-A shows the location of a cross-sectional view of the metering chamber 112. The cross section A-A 1030 is equivalent to the cross section A-A in FIG. 10. The details described with respect to FIG. 11 also apply to the cross section A-A in FIG. 19.

The aliquoting chamber 144 can be shown as also having a vent 1028. The region around the duct entrance 1014 is in this embodiment funnel-shaped. It may also be noted that the aliquoting chamber 144 is shown as not having sharp edges. The lack of sharp edges helps to facilitate the movement of fluid from the aliquoting chamber 144 to the duct entrance 1014 when the disc is decelerated.

The aliquoting chamber 144 is also shown as having a connection to a fluidic connection 1034 which leads to an excess fluid chamber 1032. The fluidic connection 1034 has a fluidic connection entrance 1036. The fluidic connection entrance 1036 defines the maximum fluid level in the aliquoting chamber 144. The maximum fluid level in the aliquoting chamber 144 is further from the rotational axis 102 than the duct exit 1016. The fluidic connection 1034 is connected to the excess fluid chamber 1032 in this example. The use of a valve or a capillary valve is optional. The excess fluid chamber is shown as having a vent 1028 and it is also connected to a fail-safe chamber 1040. When the fluid flows into the excess fluid chamber 1032 the fail safe 1040 chamber is filled. The fail safe chamber 1040 may be used to indicate optically if fluid has entered the excess fluid chamber 1032. For example during use if the fail safe chamber 1040 is not filled it may indicate that the aliquoting chamber 144 was not properly filled with fluid.

FIGS. 20-26 illustrate how the metering structure 140' may be used to perform multiple aliquotations of fluid to fluidic element 150.

Figure 20:
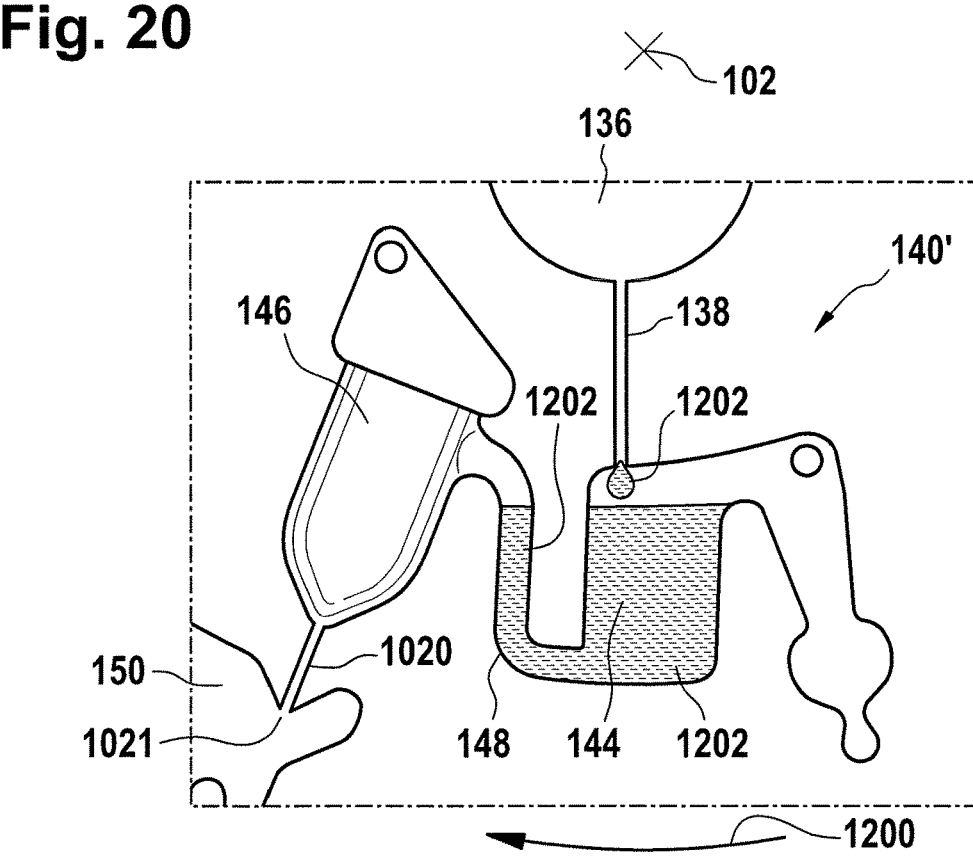
FIG. 20 illustrates part of a method of performing a dispensing fluid using the metering structure of FIG. 19.

First in FIG. 20 fluid has been added to the fluid chamber 136. The cartridge is then spun about the rotational axis 102, which forces fluid or washing buffer 1202 to travel through the first duct 106 into the aliquoting chamber 144. The fluid 1202 then fills the aliquoting chamber 144 and the corresponding radially outwards portion of the connecting duct 148 with fluid.

Figure 21:
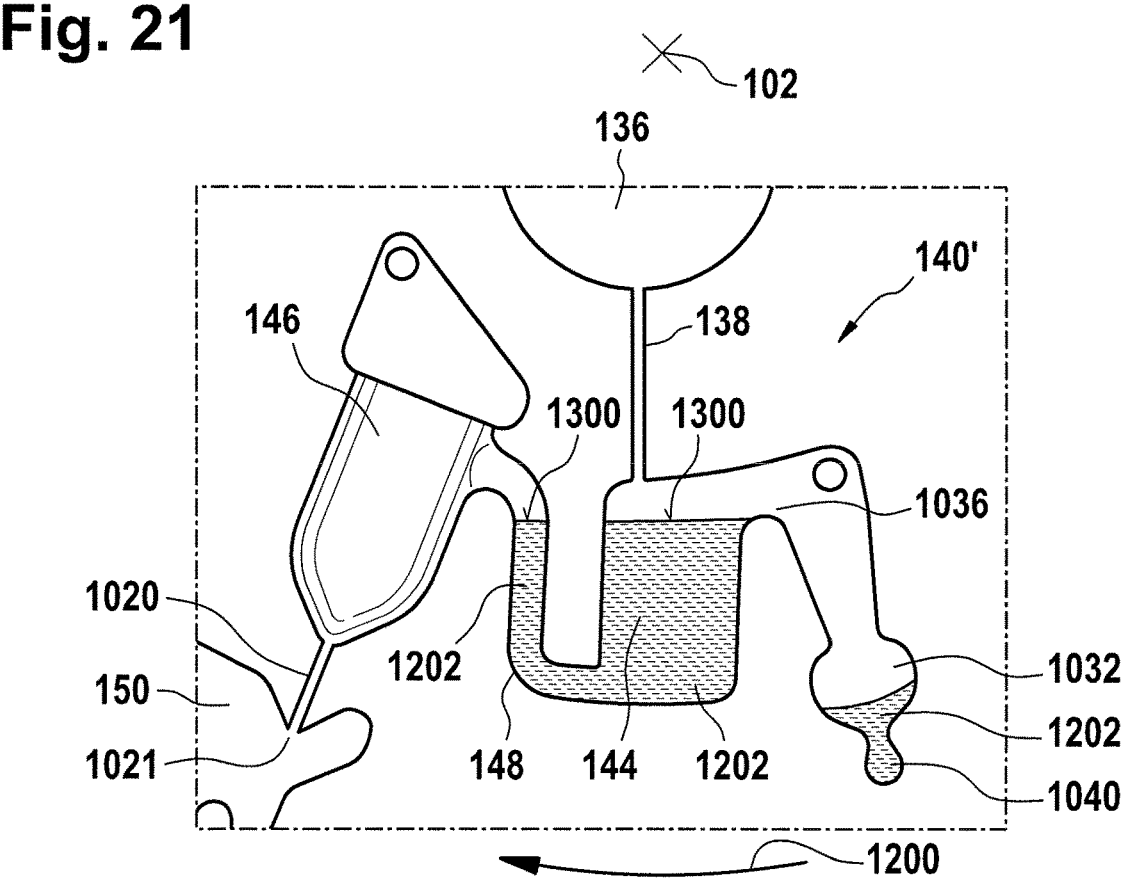
FIG. 21 further illustrates part of a method of performing a dispensing fluid using the metering structure of FIG. 19.

FIG. 21 shows the cartridge spinning at the same rate and same direction 1200 as was shown in FIG. 20. In FIG. 21 all the fluid has been drained out of the fluid chamber 136. The fluid 1202 can be shown as filling the connecting duct 148 and the aliquoting chamber 144 to the maximum fluid level 1300 which is set by the fluid connection entrance 1036. Excess fluid 1202 can be shown as being filled into the excess fluid chamber 1032 and the fail safe chamber 1040.

Figure 22:
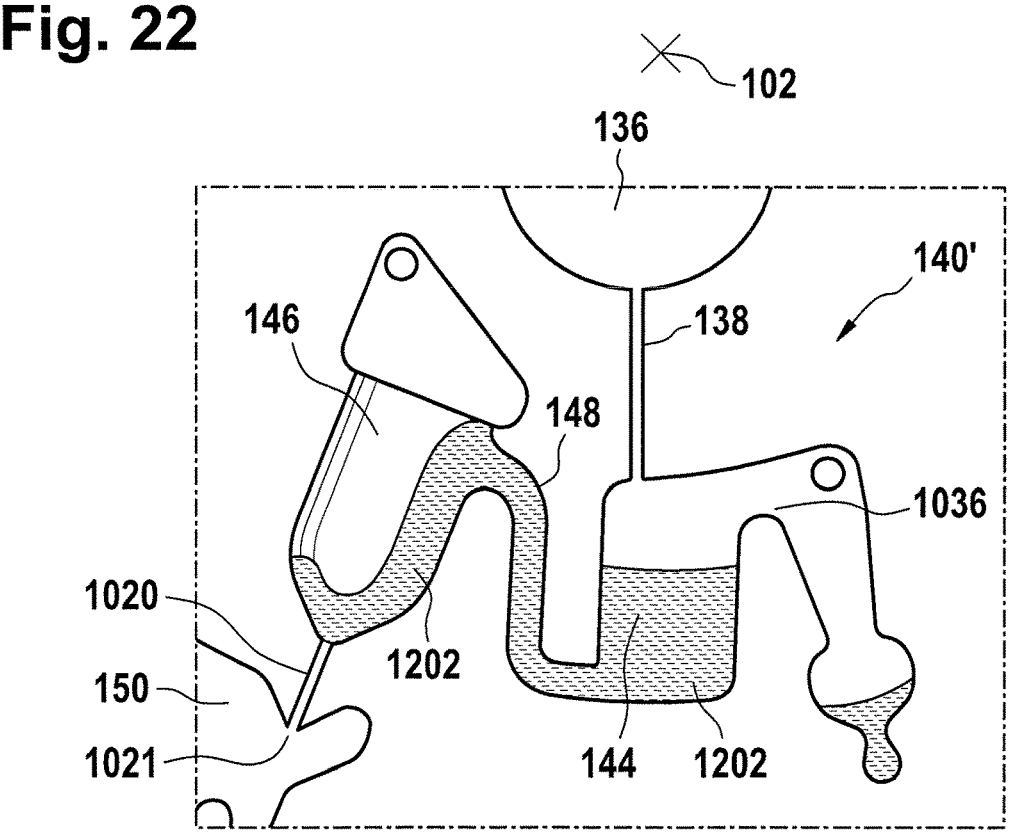
FIG. 22 further illustrates part of a method of performing a dispensing fluid using the metering structure of FIG. 19.

Next in FIG. 22 the disc stops or is decelerated to a lower rotational frequency. Capillary action in the connecting duct 148 and the metering chamber 146 is shown as beginning to draw fluid into the metering chamber 146. The fluid 1202 first fills the periphery or edge of the metering chamber 146. This is because of the tapered side walls 1104 shown in FIG. 11. Capillary action causes the side wall portion of the metering chamber 146 to fill first. This helps preventing the formation or adhesion of bubbles within the metering chamber 146. When the cartridge is rapidly de-accelerated inertia of the fluid 1202 may also help it to enter the metering chamber 146.

Figure 23:
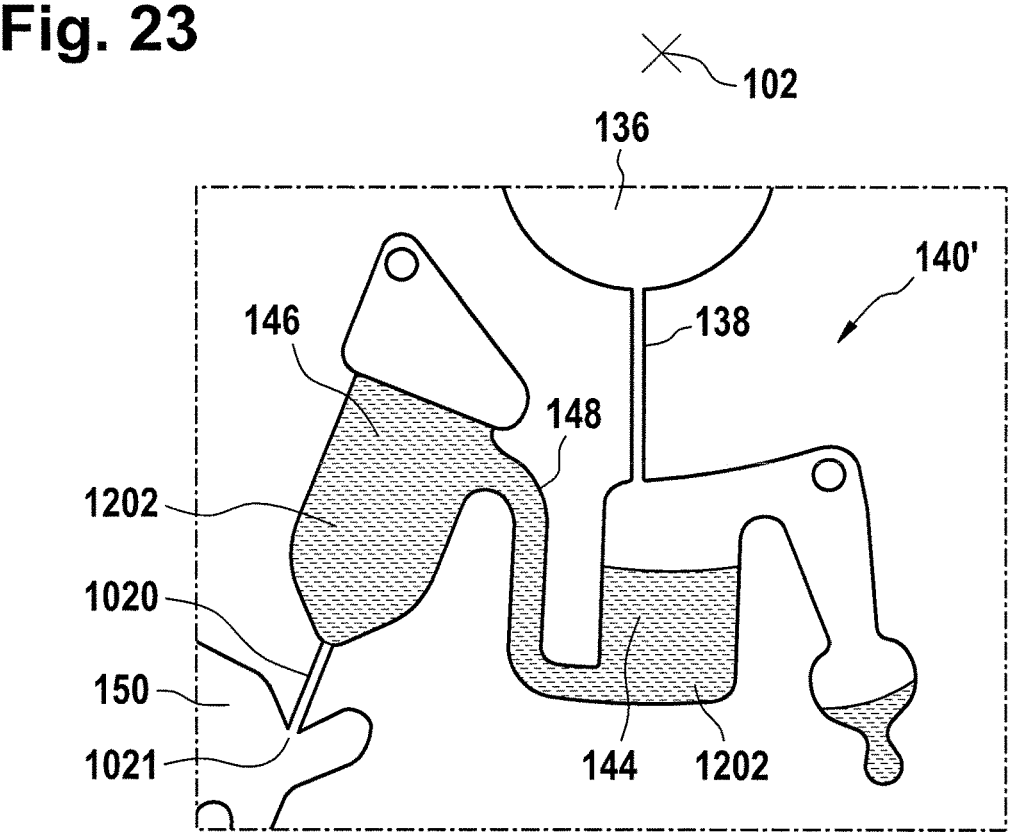
FIG. 23 further illustrates part of a method of performing a dispensing fluid using the metering structure of FIG. 19.

Next in FIG. 23 the cartridge is shown as being still stationary or at a reduced rotation rate and the metering chamber 146 is completely filled with fluid 1202. The cartridge or disc may still be considered to be at rest.

Figure 24:
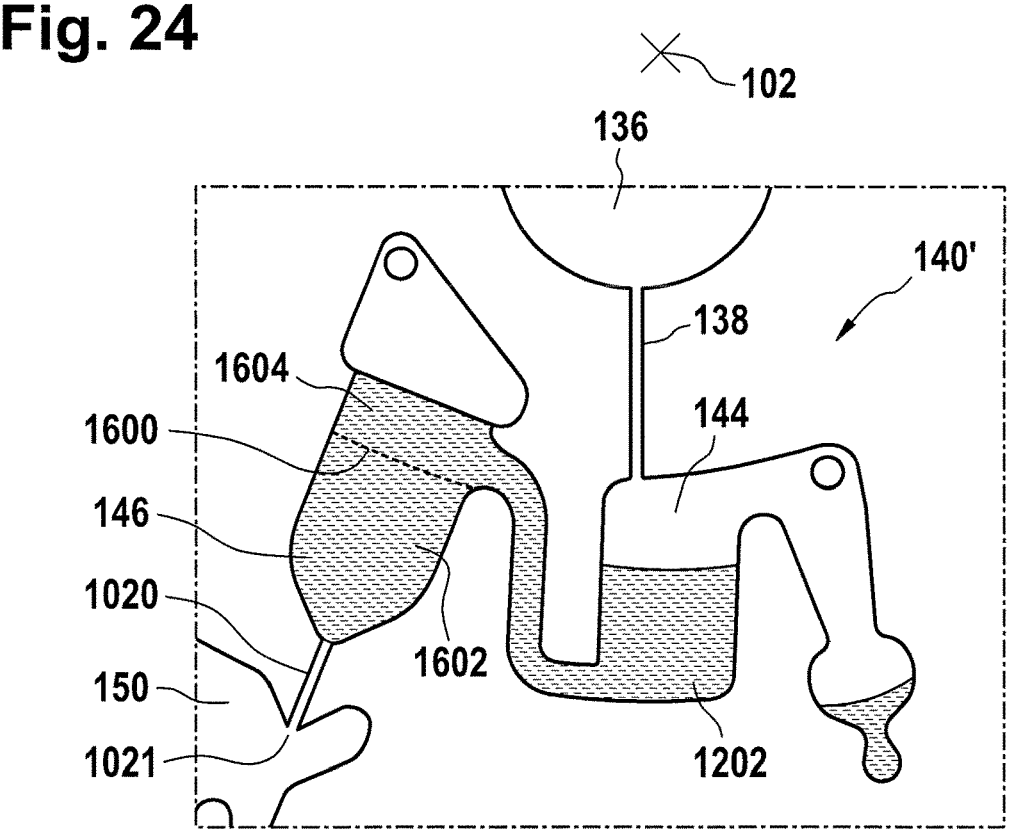
FIG. 24 further illustrates part of a method of performing a dispensing fluid using the metering structure of FIG. 19.

FIG. 24 shows the same view as is shown in FIG. 23 except a dashed line 1600 has been drawn in the metering chamber 146. This line 1600 in the metering chamber 146 divides the fluid in the metering chamber into several parts or portions. A part of the fluid volume or the whole fluid volume 1604 radially inwards (closer to the rotational axis 102) from the line 1600 may flow back into the reservoir. The radially outwards part (further away from the rotational axis 102) or part 1602 may be transferred into the fluidic element 150. The radially inward part 1604 can be referred to as the remaining part of the fluid and the radially outward part 1602 can be referred to as the part of the fluid 1602 that is transferred into the fluidic elements 150. The volume of the fluid 1602 is the aliquot.

Figure 25:
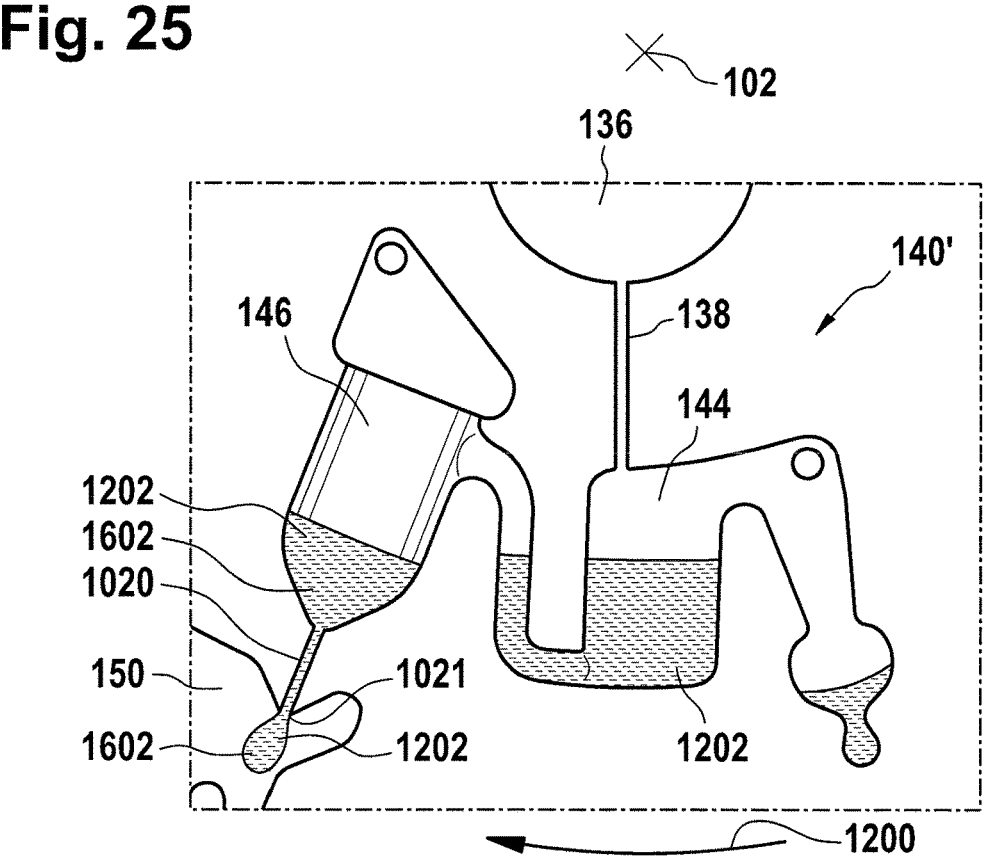
FIG. 25 further illustrates part of a method of performing a dispensing fluid using the metering structure of FIG. 19.

Next in FIG. 25 the disc begins to accelerate and spin around in the direction 1200. The disc accelerates; this causes the capillary valve 1021 to open. The remaining part of the fluid 1604 was transferred back to the aliquoting chamber 144. The part of the fluid 1602 is in the process of being transferred to the downstream fluidic element 150. A drop of the fluid 1202 can be seen dropping from the tube-like structure 1020.

Figure 26:
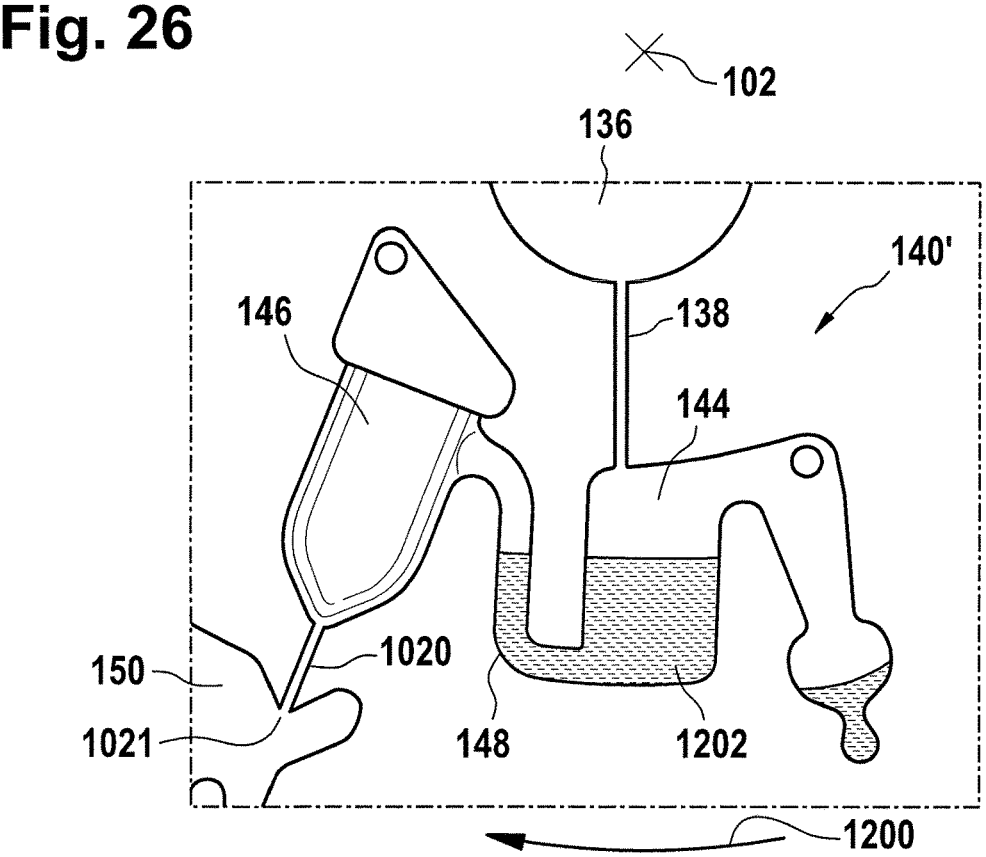
FIG. 26 further illustrates part of a method of performing a dispensing fluid using the metering structure of FIG. 19.

Next in FIG. 26 it can be seen that the fluid volume 1602 has been completely transferred to the fluidic elements 150 and is no longer visible in FIG. 26. The remaining part of the fluid 1604 has been transferred back into the aliquoting chamber 144 and is mixed with the remaining fluid 1202. The first aliquotation step is finished; the process may be repeated again from FIG. 22 and may be repeated until the fluid volume 1202 in the aliquoting chamber 144 is smaller than the volume of the metering chamber 146.

LIST OF REFERENCE NUMERALS 100 cartridge
102 rotational axis
104 circular outer edge
106 flat outer edge
108 blood inlet
110 storage chamber
112 expansion chamber
112' expansion chamber
114 vent
116 failsafe indicators
118 blood separation chamber
120 overflow chamber
122 first valve structure
124 processing chamber
126 surface for reagent
128 second valve structure
130 measurement structure
132 absorbent structure
134 chromatographic membrane
136 fluid chamber
136' fluid chamber
138 fluid duct
138' fluid duct
140 metering structure
140' metering structure
142 manual fill location
144 aliquoting chamber
146 metering chamber
148 connecting duct
150 fluidic element
300 upper portion
302 lower portion
304 overflow opening
306 siphon entrance
308 siphon exit
310 nearest location
400 valve element
402 valve element
500 first sub chamber
502 second sub chamber
504 intermediate valve structure
600 blood
602 analyte in blood
602' analyte in plasma
604 plasma generation
606 mixing plasma with dried assay reagents and incubation in processing chamber
608 capture antibody
609 transport to measurement structure
610 detection antibody
611 analyte specific binding partner complex.
612 motion of plasma across membrane 614 capture and detection zone
616 instrument control zone
618 assay control zone
620 capture element
622 artificial analyte line
700 medical system
702 cartridge spinner
704 motor
706 gripper
708 portion of cartridge
710 measurement structure
711 actuator
712 optical measurement system
714 controller
716 hardware interface
718 processor
720 electronic storage
722 electronic memory
724 network interface
726 network connection
728 laboratory information system
730 executable instructions
732 measurement
800 rotating the cartridge about the rotational axis to transport the blood sample into the blood separation chamber
802 controlling the rotation of the cartridge about the rotational axis to separate the blood plasma from the corpuscular blood sample components by centrifugation
804 opening the first valve structure and rotating the cartridge about the rotational axis to transport a defined portion of the blood plasma from the blood separation chamber to the processing chamber
806 holding the portion of the blood plasma in the processing chamber
808 releasing the seal to enable a first part of the washing buffer to enter the measurement structure
810 opening the second valve structure to transfer the at least one specific binding partner complex to the measurement structure and controlling the rotational rate of the cartridge to allow the at least one analyte specific binding partner complex to flow to the measurement structure through the second valve structure
812 controlling the rotational rate of the cartridge to allow the at least one analyte specific binding partner complex to flow across the membrane to the absorbent structure at a defined velocity and to allow the at least one analyte specific binding partner complex to bind to the immobilized binding partner
814 controlling the rotational rate of the cartridge to allow the first part of the washing buffer to flow across the membrane to the absorbent structure at a defined velocity
816 performing the measurement using the membrane and using an optical measurement system for the analyte quantization
900 cartridge in initial condition
902 place blood into inlet
904 transfer of sample to blood separation chamber
906 plasma separation by centrifugation
908 transfer blood plasma to processing chamber
910 mix blood plasma with reagent
912 release of wash buffer
914 transfer incubate to measurement structure
916 chromatography of analyte specific binding partner complex
918 metering of wash buffer
920 transfer of wash buffer
922 chromatography of wash buffer
924 measurement of analyte
1014 duct entrance
1016 duct exit
1018 circular arc
1020 tube-like structure
1021 valve
1024 expansion chamber
1026 upper edge
1028 vent
1030 profile A-A
1032 excess fluid chamber
1034 fluidic connection
1036 fluidic connection entrance
1038 capillary valve
1040 fail safe chamber
1100 cross sectional view A-A
1102 body of cartridge
1104 side walls
1106 central region
1108 lid
1110 support structure
1200 direction of rotation
1202 fluid
1300 maximum fluid level
1600 dividing line
1602 part of fluid
1604 remaining part of fluid

What is claimed is:

1. A method of determining a quantity of an analyte in a blood sample using a cartridge, wherein the cartridge is operable for being spun around a rotational axis, wherein the cartridge comprises:

an inlet for receiving the blood sample;
a blood separation chamber for separating blood plasma from the blood sample, wherein the blood separation chamber is fluidically connected to the inlet;
a processing chamber containing at least one reagent comprising at least one specific binding partner which is operable to bind to the analyte to form at least one analyte specific binding partner complex;
a first valve structure connecting the blood separation chamber to the processing chamber;
a measurement structure for enabling measurement of the quantity of the analyte, wherein the measurement structure comprises a chromatographic membrane, wherein the chromatographic membrane comprises an immobilized binding partner for direct or indirect binding of the analyte or the at least one analyte specific binding partner complex, wherein the measurement structure further comprises an absorbent structure, wherein the absorbent structure is nearer to the rotational axis than the membrane;
a second valve structure connecting the processing chamber to the measurement structure;
a fluid chamber filled with a washing buffer, wherein the fluid chamber is fluidically connected to the measurement structure, wherein a seal keeps the washing buffer within the fluid chamber;
an aliquoting chamber;
a fluid duct connecting the fluid chamber with the aliquoting chamber;
a metering chamber;
a connecting duct which fluidically connects the metering chamber with the aliquoting chamber, wherein the measurement structure is connected to the metering chamber via a third valve structure; and a vent connected to the metering chamber, wherein the vent is nearer to the rotational axis than the metering chamber;

wherein the method comprises:

placing the blood sample into the inlet;

rotating the cartridge about the rotational axis to transport the blood sample into the blood separation chamber;

controlling the rotation of the cartridge about the rotational axis to separate the blood plasma from corpuscular blood sample components by centrifugation;

opening the first valve structure and rotating the cartridge about the rotational axis to transport a defined portion of the blood plasma from the blood separation chamber to the processing chamber;

holding the portion of the blood plasma in the processing chamber, wherein the blood plasma mixes with the reagent and combines with the at least one specific binding partner to form the at least one analyte specific binding partner complex;

releasing the seal to enable a first part of the washing buffer to enter the measurement structure, wherein the step of releasing the seal enables the washing buffer to enter the aliquoting chamber;

controlling the rotational rate of the cartridge to permit the washing buffer in the aliquoting chamber to transfer into the connecting duct and to fill the metering chamber a first time;

opening the second valve structure to transfer the at least one analyte specific binding partner complex to the measurement structure and controlling the rotational rate of the cartridge to allow the at least one analyte specific binding partner complex to flow to the measurement structure through the second valve structure;

controlling the rotational rate of the cartridge to allow the at least one analyte specific binding partner complex to flow across the membrane to the absorbent structure at a defined velocity and to allow the at least one analyte specific binding partner complex to bind to the immobilized binding partner;

controlling the rotational rate of the cartridge to transfer the first part of the washing buffer from the metering chamber through the third valve structure into the measurement structure and to transfer a first remaining part back into the aliquoting chamber;

controlling the rotational rate of the cartridge to allow the first part of the washing buffer to flow across the membrane to the absorbent structure at a defined velocity;

controlling the rotational rate of the cartridge to allow the washing buffer in the aliquoting chamber to transfer into the connecting duct and to fill the metering chamber a second time;

controlling the rotational rate of the cartridge to transfer a second part of the washing buffer from the metering chamber through the third valve structure into the measurement structure and to transfer a second remaining part back into the aliquoting chamber;

controlling the rotational rate of the cartridge to allow the second part of the washing buffer to flow across the membrane to the absorbent structure; and measuring the quantity of the analyte using the membrane and using an optical measurement system.

2. The method of claim 1, wherein the method further comprises:

controlling the rotational rate of the cartridge to permit the washing buffer in the aliquoting chamber to transfer into the connecting duct and to fill the metering chamber a third time;

increasing the rotational rate of the cartridge to transfer a third part of the washing buffer from the metering chamber through the third valve structure into the measurement structure and to transfer a third remaining part back into the aliquoting chamber; and controlling the rotational rate of the cartridge to allow the third part of the washing buffer to flow across the membrane to the absorbent structure before performing the measurement.

3. The method of claim 1, wherein each of the at least one reagent is dry.

* * * * *